(12) United States Patent
Matsumura

(10) Patent No.: US 8,557,889 B2
(45) Date of Patent: *Oct. 15, 2013

(54) INK COMPOSITION AND INKJET RECORDING METHOD

(75) Inventor: Tokihiko Matsumura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 510 days.

This patent is subject to a terminal disclaimer.

(21) Appl. No.: 12/625,557

(22) Filed: Nov. 25, 2009

(65) Prior Publication Data

US 2010/0129565 A1    May 27, 2010

(30) Foreign Application Priority Data

Nov. 27, 2008  (JP) ................. 2008-302859

(51) Int. Cl.
| | | |
|---|---|---|
| C08F 2/50 | (2006.01) | |
| C08F 2/46 | (2006.01) | |
| C08J 7/04 | (2006.01) | |
| C08J 3/28 | (2006.01) | |
| C09D 11/10 | (2006.01) | |
| C09D 11/02 | (2006.01) | |

(52) U.S. Cl.
USPC .............. 522/26; 522/12; 522/15; 522/27; 522/31; 522/53; 522/909; 427/511; 427/487

(58) Field of Classification Search
USPC ............ 522/12, 15, 16, 26, 27, 31, 53, 909; 427/511, 487
See application file for complete search history.

(56) References Cited

U.S. PATENT DOCUMENTS

| | | | |
|---|---|---|---|
| 4,134,813 A | 1/1979 | Kuesters et al. | |
| 4,315,807 A | 2/1982 | Felder et al. | |
| 4,585,876 A | 4/1986 | Fischer et al. | |
| 5,145,885 A | 9/1992 | Berner et al. | |
| 5,310,618 A | 5/1994 | Kawamura | |
| 5,534,559 A | 7/1996 | Leppard et al. | |
| 5,707,781 A | 1/1998 | Wilczak | |
| 6,019,992 A | 2/2000 | Carson et al. | |
| 6,287,749 B1 | 9/2001 | Nagarajan et al. | |
| 6,528,232 B1 | 3/2003 | Maeda et al. | |
| 7,946,699 B2 * | 5/2011 | Nakazawa et al. ........... | 347/102 |
| 8,110,253 B2 * | 2/2012 | Umebayashi ................. | 427/511 |
| 8,129,447 B2 | 3/2012 | Matsumura et al. | |
| 2005/0146544 A1 | 7/2005 | Kondo | |
| 2006/0128823 A1 | 6/2006 | Tsuchimura et al. | |
| 2007/0120881 A1 | 5/2007 | Tsubaki | |
| 2007/0211111 A1 | 9/2007 | Hayata | |
| 2008/0131618 A1 * | 6/2008 | Nakamura et al. ........... | 427/511 |
| 2008/0182031 A1 | 7/2008 | Matsumura et al. | |
| 2008/0239045 A1 | 10/2008 | Umebayashi et al. | |
| 2009/0087575 A1 | 4/2009 | Matsumura et al. | |
| 2009/0186163 A1 | 7/2009 | Umebayashi et al. | |
| 2010/0015352 A1 | 1/2010 | Matsumura | |

FOREIGN PATENT DOCUMENTS

| | | |
|---|---|---|
| DE | 4117962 A1 | 12/1991 |
| DE | 19501025 A1 | 7/1996 |
| DE | 10054550 A1 | 5/2001 |
| EP | 1739141 A1 | 1/2007 |
| EP | 1757457 A1 | 2/2007 |
| EP | 1829680 A | 9/2007 |
| EP | 1944173 A | 7/2008 |
| EP | 1944173 A1 * | 7/2008 |
| EP | 1975210 A | 10/2008 |
| EP | 2033949 A | 3/2009 |
| EP | 2042573 A1 | 4/2009 |
| EP | 1826252 B1 | 1/2010 |
| EP | 1816173 B1 | 7/2010 |
| JP | 56-143202 A | 11/1981 |
| JP | 63-060783 A | 3/1988 |
| JP | 63-235382 A | 9/1988 |
| JP | 1-253731 A | 10/1989 |
| JP | 3-216379 A | 9/1991 |
| JP | 5-214280 A | 8/1993 |

(Continued)

OTHER PUBLICATIONS

Chiba Specialty Chemicals "Photoinitiators for Printing Applications:Key Products Selection Guide", Chiba Specialty Chemicals pp. 1-8(2005).
Chiba IRGACURE 819 Photoinitiator, Chiba Specialty Chemicals Inc, Aug. 30, 2001 pp. 1-3.
Chiba Darocur TPO Photoinitiator, Chiba Specialty Chemicals Inc, Aug. 29, 201 pp. 1-3.
Chiba IRGACURE 907, Chiba Specialty Chemicals Inc, Sep. 4, 2001 pp. 1-3.
Extended European Search Report on European Application No. 08015831. dated May 17, 2010.
Beilstein Institute for Organic Chemistry, XP002580198, Dec. 31, 1975.
Bruce M. Monroe, et al., "pHOTOINITIATORS for Free-Radical-Initiated Photoimaging System", Chemical Reviews, vol. 93 , pp. 435 to 448 (1993).

(Continued)

Primary Examiner — Sanza McClendon
(74) Attorney, Agent, or Firm — SOLARIS Intellectual Property Group, PLLC

(57) ABSTRACT

The invention provides an ink composition including a sensitizer represented by the following Formula (I), a photopolymerization initiator, and a polymerizable compound having an ethylenic unsaturated bond. In the Formula (I), $R^1$, $R^6$ and $R^8$ each independently represent a hydrogen atom, a hydroxyl group, a halogen atom, a linear or branched alkyl group which may be substituted, or an alkoxy group which may be substituted. $R^2$, $R^4$, $R^5$ and $R^7$ each independently represent a hydrogen atom, a halogen atom, or a cyano group. $R^3$ represents a hydrogen atom, a linear or branched alkyl group which may be substituted, or a cycloalkyl group which may be substituted.

(I)

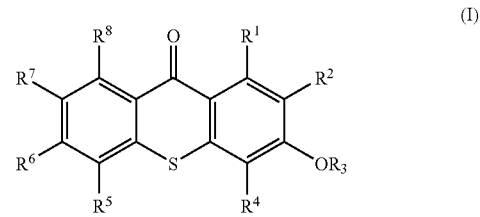

9 Claims, No Drawings

(56) References Cited

FOREIGN PATENT DOCUMENTS

| | | |
|---|---|---|
| JP | 6-021256 B | 3/1994 |
| JP | 6-21256 B2 | 3/1994 |
| JP | 6-062905 B | 8/1994 |
| JP | 6-62905 B2 | 8/1994 |
| JP | 6-308727 A | 11/1994 |
| JP | 8-174997 A | 7/1996 |
| JP | 2003-145745 A | 5/2003 |
| JP | 2004-042525 A | 2/2004 |
| JP | 2004-042548 A | 2/2004 |
| JP | 2005-096254 A | 4/2005 |
| JP | 2005-512973 A | 5/2005 |
| JP | 2006-137183 A | 6/2006 |
| JP | 2006-137185 A | 6/2006 |
| JP | 2006-182970 A | 7/2006 |
| JP | 2007-314610 A | 12/2007 |
| JP | 2008-195926 | 8/2008 |
| JP | 2009-221439 A | 10/2009 |

OTHER PUBLICATIONS

Chiba IRGACURE 819 Product Information pp. 1-4, Aug. 8, 1997.
Third Party Observation No. Art.115 EPC. date Dec. 21, 2010.
Office Action dated Apr. 7, 2011 on European Application Mo. 08015.831.4.
European Search Report dated Apr. 27, 2010 issued for the corresponding European patent application No. 09176998.4.
Bruce M. Monroe, et. al., Chemical Reviews, vol. 93 (1993), pp. 435-448.
Partial Engligh language translation of the following: Office action dated May 7, 2013 from the Japanese Patent Office in a Japanese patent application corresponding to the instant patent application. This office action translated is submitted now in order to supplement the understanding of patent document JP 2008-195926 which is cited in the office action and are being disclosed in the instant Information Disclosure Statement.

\* cited by examiner

INK COMPOSITION AND INKJET RECORDING METHOD

CROSS-REFERENCE TO RELATED APPLICATION

This application claims priority under 35 USC 119 from Japanese Patent Application No. 2008-302859 filed on Nov. 27, 2008, the disclosure of which is incorporated by reference herein.

BACKGROUND

1. Field of the Invention

The present invention relates to an ink composition and an inkjet recording method using the same.

2. Related Art

As an image recording method for forming an image on an inkjet recording medium such as paper with image data signal, there is an electrophotographic method, a sublimation type and a fusion type heat transfer method, an inkjet method and the like. For example, with respect to the inkjet method, it can be carried out by using an inexpensive device and an image is formed directly on a recording medium by jetting ink only on a required image part to achieve efficient use of ink, and therefore running cost is low. In addition, the inkjet method generates little noise and is an excellent image recording method.

According to the inkjet method, printing can be made not only on a regular paper but also on a recording medium which has no absorption property, for example, a plastic sheet, a metal plate and the like. In this case, however, increasing the printing speed and improving the image quality are an important subject to achieve. In addition, the inkjet method is characterized in that the time required for drying and curing of droplets after printing has a huge effect on productivity of a printing material or sharpness of a printing image.

As an image recording method using an inkjet method, a recording method using inkjet recording ink, which can be cured by radiation, can be mentioned. According to this recording method, radiation is applied right after ink ejection or after a certain period of time and then ink droplets are cured so that a sharp image with improved printing productivity can be formed.

By achieving high-sensitization of an inkjet ink composition which can be cured by radiation such as UV ray, high radiation curability can be obtained, and many advantages including improved productivity of inkjet recording, reduced power consumption, longer life time due to decreased load on radiation generator, and inhibited volatilization of a low molecular weight material based on insufficient curing. can be obtained. In addition, high-sensitization is particularly important for improving strength of a formed image.

An inkjet method based on curing by radiation, for example UV ray, recently draws attention because it generates relatively little odor, dries fast, and recording can be made even on a recording medium having no ink absorptivity. An ink composition for UV ray curing type inkjet in which radical polymerization is used has been suggested (for example, see, Japanese Patent Application Laid-Open (JP-A) Nos. 63-235382, 3-216379, 5-214280, Japanese Patent Application Publication (JP-B) Nos. 6-21256 and 6-62905).

In addition, as an inkjet ink composition which has high curing sensitivity and can provide an image with good quality, an inkjet ink composition which includes at least one hydrophobic polymer selected from the group consisting of a fluorine-containing polymer, a long chain alkyl group-containing polymer and an alicyclic group-containing polymer is known (for example, see JP-A No. 2006-182970).

However, such an inkjet ink composition is problematic in that a sticky image is produced or a low molecular weight component is exuded from image surface (so-called, "oozing out"), and thus blocking resistance is insufficient.

Meanwhile, as for the ink composition for a UV ray curing type inkjet, benzyl, benzoin, benzoin ethyl ether, Michler's ketone, anthraquinone, acridine, phenazine, benzophenone, 2-ethyl anthraquinone and the like have been generally used as an initiator for photopolymerization (for example, see, Bruce M. Monroe, et. al., Chemical Reviews, Vol. 93 (1993), pp. 435-448).

However, when such initiator for photopolymerization is used, because curing responsivity of an ink composition is poor, a long period of time is required for image exposure for forming an image. Thus, when a fine image is to be produced, an image with good quality cannot be reproduced if there is a subtle vibration during operation. In addition, since increased amount of energy radiation is required for exposure light source, liberation of a great amount of heat generated therefrom has to be taken into consideration.

In general, with respect to a radiation curing type ink composition, use of various kinds of polymerization initiation system is described as a way of improving sensitivity to radiation (see, Bruce M. Monroe, et. al., Chemical Reviews, VOl. 93 (1993), pp. 435-448, U.S. Pat. No. 4,134,813, JP-A Nos. 1-253731 and 6-308727). However, there is no example in which a polymerization initiation system, which has satisfying sensitivity to scanning exposure, is adopted for an ink composition.

In addition, jetting stability is also required for an inkjet ink composition.

As it has been discussed above, development of an ink composition, which can be cured by radiation with high sensitivity and form an image with high jetting stability in an inkjet recording, has been expected.

SUMMARY

The present invention has been made in view of the circumstances described above.

A first aspect of the invention provides an ink composition containing (i) a sensitizer represented by the following Formula (I), (ii) a photopolymerization initiator, and (iii) a polymerizable compound having an ethylenic unsaturated bond.

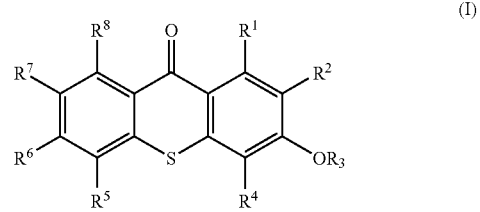

In the Formula (I), $R^1$, $R^6$ and $R^8$ each independently represent a hydrogen atom, a hydroxyl group, a halogen atom, a linear or branched alkyl group which may be substituted, or an alkoxy group which may be substituted. $R^2$, $R^4$, $R^5$ and $R^7$ each independently represent a hydrogen atom, a linear or branched alkyl group which may be substituted, a halogen atom, or a cyano group. $R^3$ represents a hydrogen atom, a linear or branched alkyl group which may be substituted, or a cycloalkyl group which may be substituted. When $R^3$ represents a linear or branched alkyl group, the alkyl group may consist of two or more alkyl chains that are connected to each other via one or more oxygen atom.

The ink composition of the invention is useful for an inkjet recording.

A second aspect of the invention provides an inkjet recording method including (1) jetting the ink composition of the invention onto a recording medium, and (2) irradiating the jetted ink composition with active radiation and cure the inkjet ink composition.

DETAILED DESCRIPTION OF THE INVENTION

1. Ink Composition

As a result of intensive studies, inventors of the invention found the combined use of a sensitizer having a specific structure, a photopolymerization initiator and a polymerizable compound having an ethylenic unsaturated bond, and therefore completed the invention.

The ink composition of the invention contains (i) a sensitizer represented by the following Formula (I) (hereinafter, simply referred to as a "specific sensitizer"), (ii) a photopolymerization initiator, and (iii) a polymerizable compound having an ethylenic unsaturated bond.

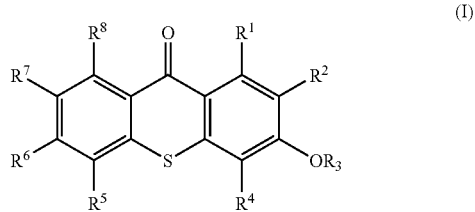

(I)

In the Formula (I), $R^1$, $R^6$ and $R^8$ each independently represent a hydrogen atom, a hydroxyl group, a halogen atom, a linear or branched alkyl group which may be substituted, or an alkoxy group which may be substituted. $R^2$, $R^4$, $R^5$ and $R^7$ each independently represent a hydrogen atom, a linear or branched alkyl group which may be substituted, a halogen atom, or a cyano group. $R^3$ represents a hydrogen atom, a linear or branched alkyl group which may be substituted, or a cycloalkyl group which may be substituted. When $R^3$ represents a linear or branched alkyl group, the alkyl group may consist of two or more alkyl chains that are connected to each other via one or more oxygen atom.

Although the mechanism of the ink composition of the invention remains unclear, the following is presumed.

The sensitizer represented by Formula (I), which is one of the characteristic components contained in the ink composition of the invention, is a sensitizer which has full absorption in the range of 300 nm to 400 nm and has high triplet energy. As such, it is thought that, when irradiated with active radiation, radical generation is promoted as triplet energy is efficiently transferred from the sensitizer to a photopolymerization initiator and, as a result, high sensitization of the inkjet ink composition is achieved.

Further, contact between a sensitizer and an initiator is important for sensitizing by triplet energy transfer, and the sensitizer represented by the Formula (I) also has a characteristic of high solubility. Therefore, for an ink composition such as an inkjet ink composition which requires low viscosity, it is thought that the sensitizer represented by Formula (I) will effectively function in a low viscosity region because it has better molecular diffusion.

The essential components for the ink composition of the invention will be explained below.

<(i) Specific Sensitizer>

The ink composition of the invention contains a sensitizer in order to promote degradation of a photopolymerization initiator by irradiation with active radiation. As a sensitizer, the specific sensitizer that will be explained below in detail is contained as an essential component.

In general, by absorbing specific active radiation, a sensitizer is transformed into an electron exited state. Once transformed into an electron excited state, the sensitizer causes various reactions such as electron transfer, energy transfer and heat discharge, as it is brought into contact with a photopolymerization initiator. As a result, chemical change will occur in the photopolymerization initiator, i.e., degradation and formation of active species such as a radical, an acid, a base or the like, and such active species generated therefrom will cause and promote polymerization and a curing reaction of a polymerizable compound that is described below.

As a sensitizer contained an ink composition which is cured by irradiation with active radiation such as the ink composition of the invention, a compound is used that is determined based on the wavelength of active radiation needed to produce an initiation species from a photopolymerization initiator. Considering the exposure light source that is generally used for a curing reaction of an ink composition, compounds having an absorption wavelength in the region of 350 nm to 450 nm may be used as preferred examples of the sensitizer. The specific sensitizer of the invention is a sensitizer having such characteristics, and by containing the specific sensitizer as an essential component, the ink composition of the invention can exhibit enhanced degradation of a photopolymerization initiator as a result of irradiation of active radiation.

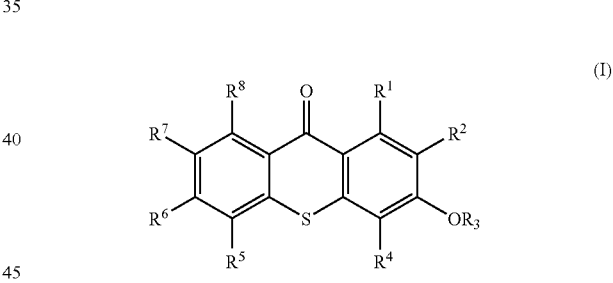

(I)

In the Formula (I), $R^1$, $R^6$ and $R^8$ each independently represent a hydrogen atom, a hydroxyl group, a halogen atom, a linear or branched alkyl group which may be substituted, or an alkoxy group which may be substituted. $R^2$, $R^4$, $R^5$ and $R^7$ each independently represent a hydrogen atom, a linear or branched alkyl group which may be substituted, a halogen atom, or a cyano group. $R^3$ represents a hydrogen atom, a linear or branched alkyl group which may be substituted, or a cycloalkyl group which may be substituted. When $R^3$ represents a linear or branched alkyl group, the alkyl group may consist of two or more alkyl chains that are connected to each other via one or more oxygen atom. Herein below, the Formula (I) will be explained in detail.

When $R^1$, $R^2$, $R^4$, $R^5$, $R^6$, $R^7$ or $R^8$ in the Formula (I) represents a halogen atom, the halogen atom includes a chlorine atom, a bromine atom and an iodine atom. A chlorine atom, a bromine atom and an iodine atom are more preferred, and a chlorine atom and a bromine atom are still more preferred.

When $R^1$, $R^6$ or $R^8$ in the Formula (I) represents a linear or branched alkyl group, an alkyl group having 1 to 8 carbon atoms is preferred as the alkyl group. Preferred examples thereof include a methyl group, an ethyl group, a propyl group, an isopropyl group, a n-butyl group, a sec-butyl group, a t-butyl group, a hexyl group or a 2-ethylhexyl group. More preferably, it is a methyl group, an ethyl group, a propyl group or an isopropyl group.

When $R^2$, $R^4$, $R^5$ or $R^7$ in the Formula (I) represents a linear or branched alkyl group, an alkyl group having 1 to 8 carbon atoms is preferred as the alkyl group. Preferred examples thereof include a methyl group, an ethyl group, a propyl group, an isopropyl group, an n-butyl group, a sec-butyl group, a t-butyl group, a hexyl group or a 2-ethylhexyl group. More preferably, it is a methyl group, an ethyl group, a propyl group or an isopropyl group.

When $R^1$, $R^6$ or $R^8$ in the Formula (I) represents an alkoxy group, an alkoxy group having 1 to 8 carbon atoms is preferred as the alkoxy group. Preferred examples thereof include a methoxy group, an ethoxy group, an isopropoxy group, a propoxy group, an n-butoxy group, an iso-butoxy group, a sec-butoxy group, a t-butoxy group, a hexyloxy group or a 2-ethylhexyloxy group. More preferably, it is a methoxy group, an ethoxy group, an isopropoxy group, a propoxy group, an n-butoxy group, an iso-butoxy group, or a sec-butoxy group.

The alkyl moiety included in the alkoxy group, which is represented by $R^1$, $R^6$ or $R^8$, may consist of two or more alkyl chains that are connected to each other via one or more oxygen atom. Examples of such alkyl chain include an alkyl chain including an ethylene oxide chain or a propylene oxide chain in the alkyl chain.

As for $R^1$, $R^6$ and $R^8$, in terms of their independent absorption property, a hydrogen atom, an alkyl group or an alkoxy group is preferred. In terms of obtainability of a source material, a hydrogen atom is most preferred.

As for $R^2$, $R^4$, $R^5$ and $R^7$, in terms of their independent absorption property, a halogen atom, a cyano group or a hydrogen atom is preferred. In terms of obtainability of a raw material, a hydrogen atom is particularly preferred.

When $R^3$ in the Formula (I) represents a linear or branched alkyl group, an alkyl group having 1 to 18 carbon atoms is preferred for the alkyl group. Preferred examples thereof include a methyl group, an ethyl group, a propyl group, an isopropyl group, an n-butyl group, a sec-butyl group, a t-butyl group, a hexyl group, a 2-ethylhexyl group, an n-pentyl group, an n-hexyl group, an n-octyl group, an n-decyl group, an n-dodecyl group, an n-tetradecyl group, an n-hexadecyl group, or an octadecyl group.

Among these alkyl groups that are represented by $R^3$, in terms of solubility of the specific sensitizer, an alkyl group having a total carbon atom number of 3 to 10 is preferred. An alkyl group having a total carbon atom number of 4 to 8 is more preferred. Herein, a total carbon atom number of the alkyl group means that, when the alkyl group that is represented by $R^3$ further includes a substituent group, it may include the carbon atom number of an alkyl group included in the corresponding substituent group.

In addition, as for $R^3$, a substituent group having a branched structure is preferred. More preferred examples of such substituent group having a branched structure include an isobutoxy group which has been described above as an example of the alkoxy group, a sec-butyl group or a 2-ethylhexyl group which has been described above as an example of the alkyl group.

When $R^3$ represents a linear or branched alkyl group, such alkyl group may consist of two or more alkyl chains that are connected to each other via one or more oxygen atom. Examples of such alkyl group include an alkyl group including an ethylene oxide chain or a propylene oxide chain in the alkyl chain.

As for a cycloalkyl group that is represented by $R^3$, specific examples thereof include a cycloalkyl group having 3 to 8 carbon atoms, and a cyclobutyl group, a cyclopentyl group or a cyclohexyl group is preferred.

The alkyl group or alkoxy group that is represented by $R^1$, $R^6$ or $R^8$, or the alkyl group that is represented by $R^3$ may further include a substituent group. Examples of such substituent group include —$NR^9R^{10}$, a hydroxy group, an acryloyloxy group, and a metacryloyloxy group. $R^9$ and $R^{10}$ in —$NR^9R^{10}$ each independently represent a hydrogen atom or an alkyl group having 1 to 4 carbon atoms, and $R^9$ and $R^{10}$ may bond to each other to form a ring. The ring which is formed by bonding between $R^9$ and $R^{10}$ may include —O—, —S— or —$NR^{11}$— in its structure. $R^{11}$ represents an alkyl group having 1 to 4 carbon atoms. Examples of —$NR^9R^{10}$ group in which $R^9$ and $R^{10}$ bond to each other to form a ring include the followings.

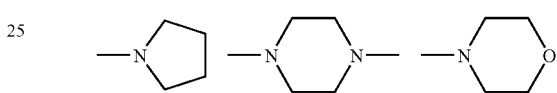

Among these substituent groups, from the view point of blocking resistance, —$NR^9R^{10}$ group or an aryloyloxy group is preferred.

Specific examples of the specific sensitizer of the invention are described herein below (i.e., Exemplary compound (I-1) to (I-31)). However, the invention is not limited thereto.

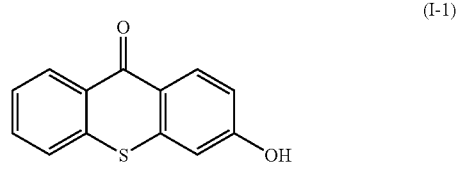

(I-1)

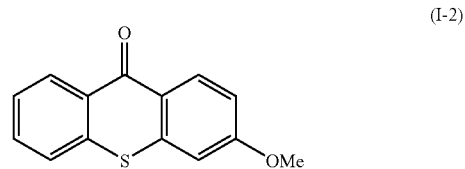

(I-2)

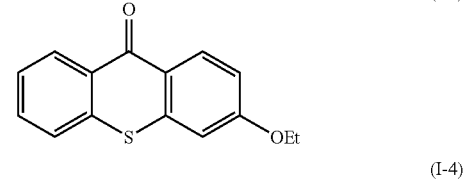

(I-3)

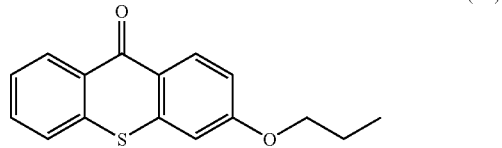

(I-4)

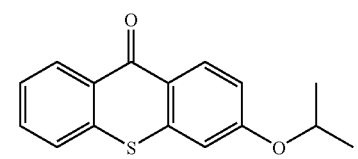 (I-5)
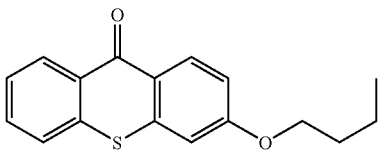 (I-6)
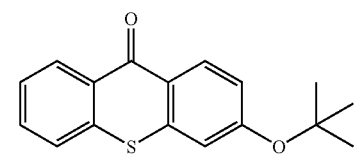 (I-7)
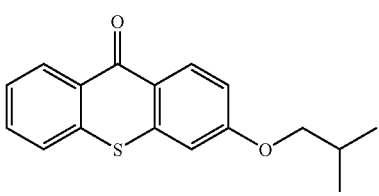 (I-8)
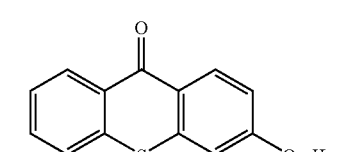 (I-9)
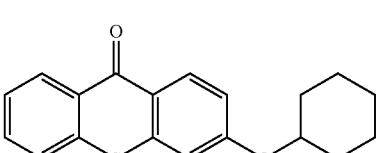 (I-10)
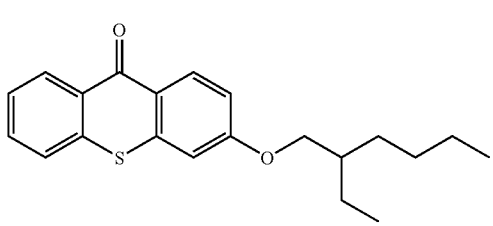 (I-11)
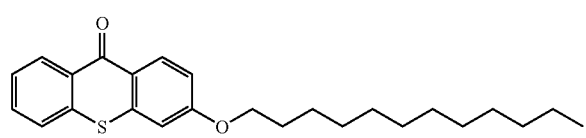 (I-12)
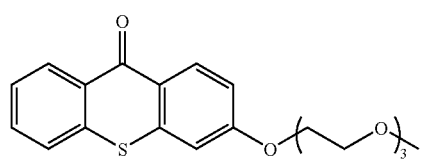 (I-13)
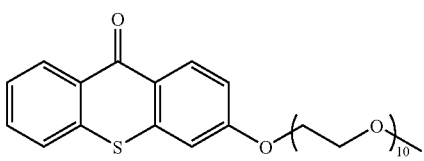 (I-14)
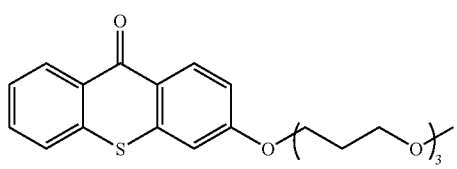 (I-15)
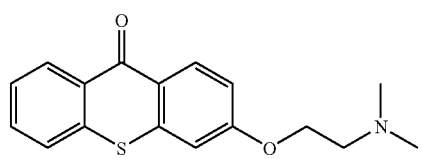 (I-16)
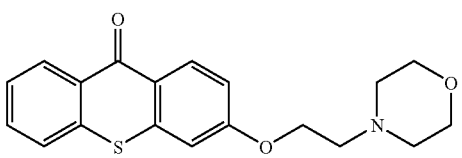 (I-17)
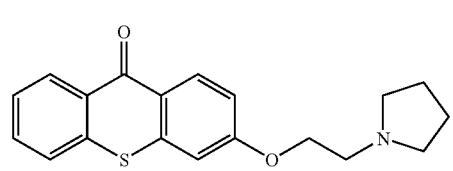 (I-18)
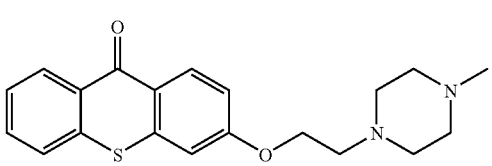 (I-19)
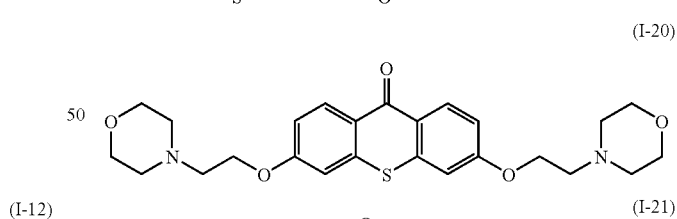 (I-20)
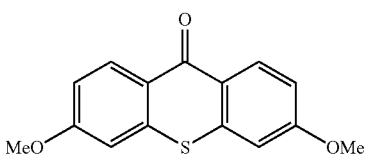 (I-21)
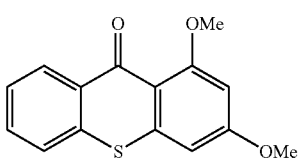 (I-22)

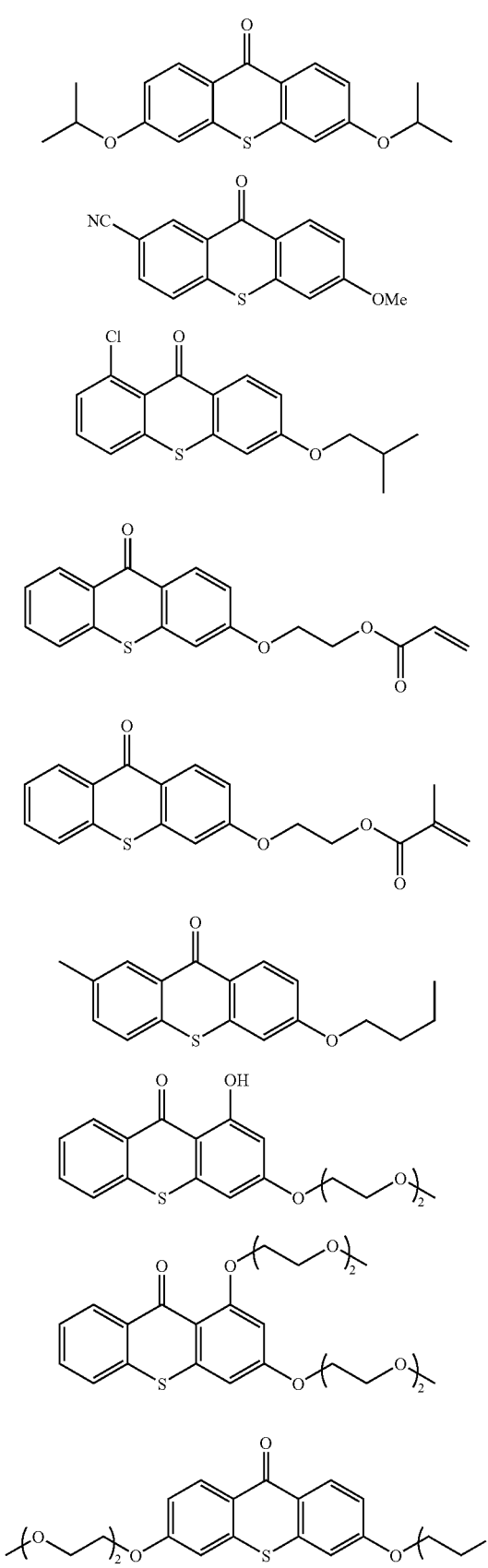

Among the above exemplified compounds, in terms of a curing property and jetting stability, I-6, I-7, I-8, I-9, I-10, I-11, I-13, I-16, I-17, I-18, I-23 and I-25 are preferred, I-6, I-8, I-9, I-10, I-11 and I-17 are more preferred, and I-8 and I-11 are still more preferred.

In addition, the specific sensitizer can be synthesized according to a known method described in the documents, for example, JP-A No. 7-10829, "SYNLETT" p 2453 (2005) and "Chemical & Pharmaceutical Bulletin" p 36 (1989).

Synthetic example for the above Exemplary compounds (I-1) and (I-11) are specifically described below. Other specific sensitizers can be also synthesized with the same method.

Synthetic Example for the Exemplary Compound (I-1)

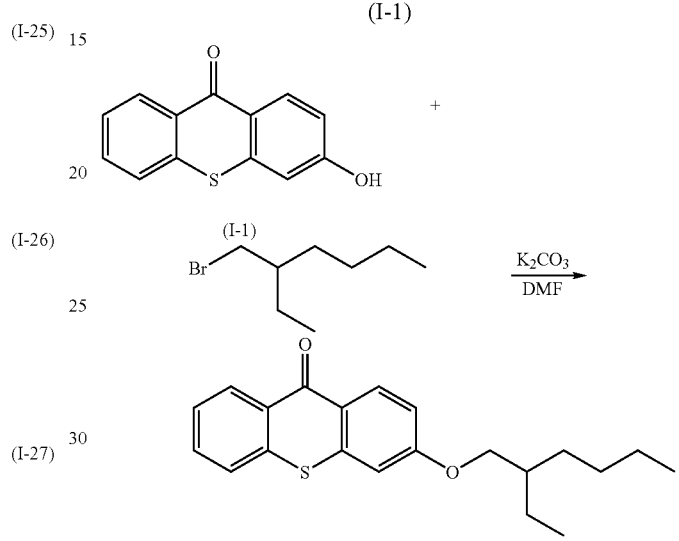

10 g of The Exemplary compound (I-2), which had been synthesized according to the method described in the document ("SYNLETT" p 2453 (2005)) was dissolved in 200 ml of acetic acid (200 ml) and 500 ml of hydrogen bromide acid (47% solution, 500 ml). The solution was warmed to 105° C. in an oil bath and then refluxed under heating for 10 hours. Thereafter, the solution was cooled to room temperature, added with water and extracted with ethyl acetate. The extract was washed with dilute hydrochloric acid and saturated brine, dried over magnesium sulfate and filtered. The filtrate was concentrated using an evaporator. The concentrated filtrate was purified by silica gel column (development solution: hexane/ethyl acetate) to obtain the Compound (I-1) in an amount of 8.0 g.

Synthetic Example for the Exemplary Compound (I-11)

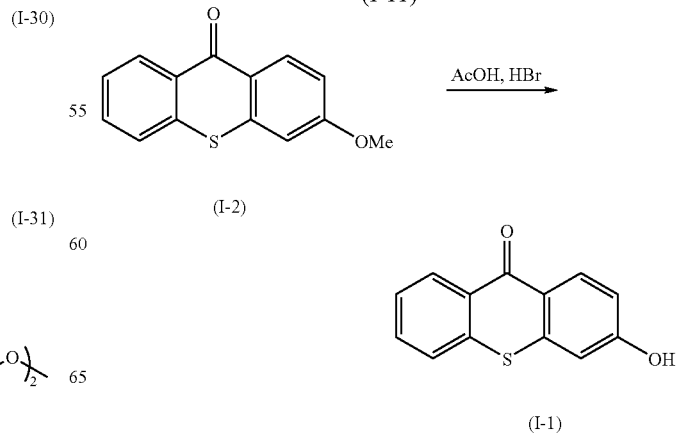

9.0 g of the Exemplary compounds (I-2), which can be synthesized according to the method described above, and 8.2 g of K₂CO₃ were dissolved in 100 ml of DMF. By using a cooling bath, the temperature was lowered to 0° C. and 10.5 ml of 2-ethylhexyl bromide was slowly added dropwise thereto. Thereafter, the solution was warmed to room temperature and stirred for 5 hours. Upon the completion of the reaction, the reaction solution was added with water and extracted with ethyl acetate. The extract was washed with dilute hydrochloric acid and saturated brine, dried over magnesium sulfate and filtered. The filtrate was concentrated using an evaporator. The precipitated solid was recrystallized with ethyl acetate and hexane to obtain the Compound (I-11) in an amount of 12.0 g.

Only one kind of the specific sensitizer may be included in the ink composition of the invention, or they may be contained in combination of two or more.

Content of the specific sensitizer in the ink composition of the invention is, based on solid matter relative to the ink composition, preferably 0.05% to 30% by mass, more preferably 0.1% to 20% by mass, and still more preferably 0.2% to 10% by mass.

Further, with respect to the relationship between a photopolymerization initiator and the content of the specific sensitizer, they are included in an amount that the weight ratio between their content (i.e., photopolymerization initiator: specific sensitizer) is preferably 200:1 to 1:200, more preferably 50:1 to 1:50, and still more preferably 20:1 to 1:5.

Further, the specific sensitizer mostly has no absorption in visible range so that it is advantageous in that it has no effect on color of the ink composition even when it is added in an amount which can exhibit its desired effect.

<Other Sensitizers>

According to the invention, in addition to the specific sensitizer described above, other well known sensitizers (hereinafter, appropriately referred to as "other sensitizer") can be also used if it does not impair the effect of the invention. Other sensitizer can be added in an amount to have its weight ratio relative to the specific sensitizer (specific sensitizer: other sensitizer) preferably 1:5 to 100:1, more preferably 1:1 to 100:1, and still more preferably 2:1 to 100:1.

Examples of other sensitizer include thioxanthones, benzophenones, thiochromanones, carbazoles, xanthones, anthraquinone and 3-acyl coumarine derivatives, terphenyl, styrylketone and 3-(aroylmethylene)thiazoline, camphor quinone, eosin, rhodamine and erythrocin, barbituric acid derivatives, thiobarbituric acid derivatives and the like.

More specific examples of other sensitizer include the followings.

(1) Thioxanthones

Examples of thioxanthones include thioxanthone, 2-isopropylthioxanthone, 2-chlorothioxanthone, 2-mercaptothioxanthone, 2-dodecylthioxanthone, 2,4-di-ethylthioxanthone, 2,4-dimethylthioxanthone and the like.

(2) Benzophenones

Examples of benzophenones include benzophenone, 4,4'-dimethylaminobenzophenone, 4,4'-diethylaminobenzophenone, 4-(4-methylthiophenyl)benzophenone and the like.

(3) Thiochromanones

Examples of thiochromanones include the sensitizer that is represented by the following Formula (II) and the compounds described in U.S. Patent Laid-Open No. 2008/0182031A1, including thiochromanone, 6-chlorothiochromanone, 2,2,6-trimethylthiochromanone and the like.

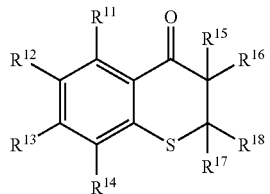

(II)

In Formula (II), $R^{11}$, $R^{12}$, $R^{13}$, $R^{14}$, $R^{15}$, $R^{16}$, $R^{17}$ and $R^{18}$ in the Formula (II) each independently represent a hydrogen atom, alkyl group, a halogen atom, a hydroxy group, a cyano group, a nitro group, an amino group, an alkylthio group, an alkylamino group, an alkoxy group, an alkoxycarbonyl group, an acyloxy group, an acyl group, a carboxy group or a sulfo group.

Two of $R^{11}$, $R^{12}$, $R^{13}$ and $R^{14}$ that are adjacent to one another may fuse together to form a 5- to 6-membered aliphatic ring, an aromatic ring or a heterocyclic ring. With further combination among these ring structures, a bicyclic ring, for example, a fused ring, may be formed. When the ring structure is a heterocyclic ring, examples of a heteroatom included in the heterocyclic ring include N, O and S. Further, these ring structures may further have a substituent group and examples of the substituent group include a halogen atom, an aliphatic group, an aromatic group, a heterocyclic group, a cyano group, a hydroxy group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfoneamide group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a sulfinyl group, a phosphoryl group, an acyl group, a carboxy group or a sulfo group and the like.

Although $R^{15}$ or $R^{16}$ may be connected to $R^{17}$ or $R^{18}$ to form an aliphatic ring, they do not form an aromatic ring.

(4) Carbazoles

Examples of carbazoles include 9-ethylcarbazole, 9-vinylcarbazole, 9-phenylcarbazole, 3-(2-methylbenzoyl)-9-ethylcarbazole, the compounds described in JP-A No. 2005-343847 and the like.

Among these sensitizers, in terms of improving curing sensitivity, the sensitizer of the above (3) thiochromanones, i.e., the sensitizer that is represented by the Formula (II), is preferably used in combination with the specific sensitizer of the invention.

Herein below, including those described in detail in the above, specific examples of other sensitizer are described. However, other sensitizer which can be applied for the invention is not limited thereto. In addition, those exemplified as II-1 to II-31 in the following specific examples are an example of the sensitizer that is represented by the Formula (II).

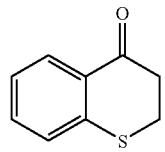

(II-1)

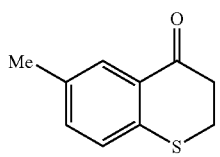 (II-2)
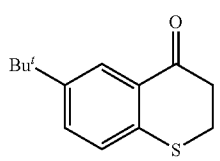 (II-3)
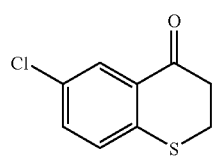 (II-4)
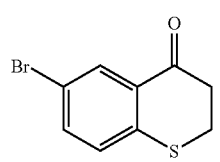 (II-5)
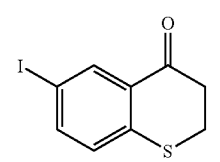 (II-6)
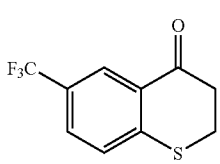 (II-7)
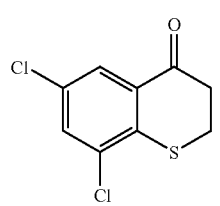 (II-8)
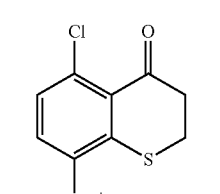 (II-9)
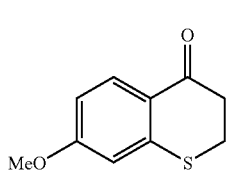 (II-10)
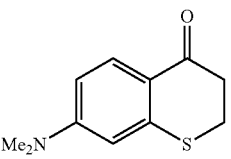 (II-11)
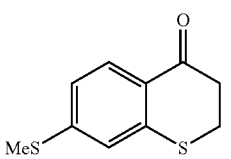 (II-12)
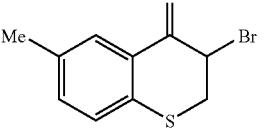 (II-13)
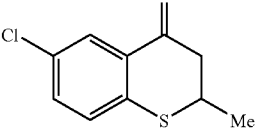 (II-14)
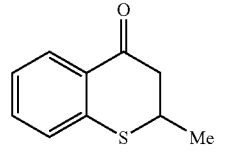 (II-15)
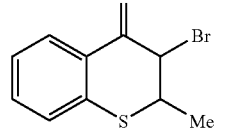 (II-16)
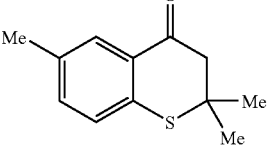 (II-17)
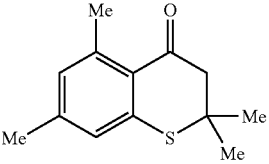 (II-18)
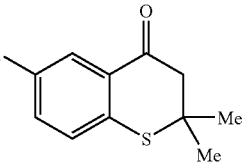 (II-19)

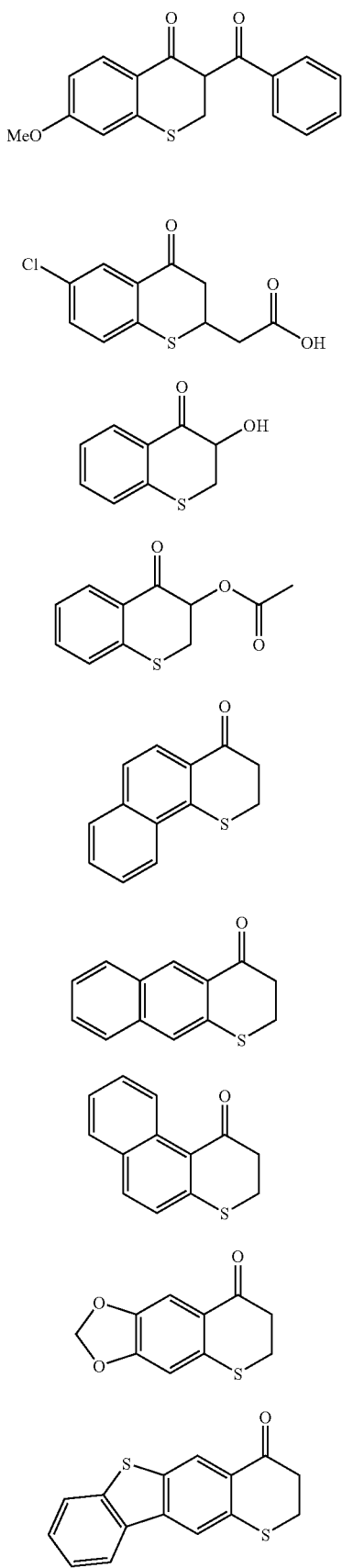
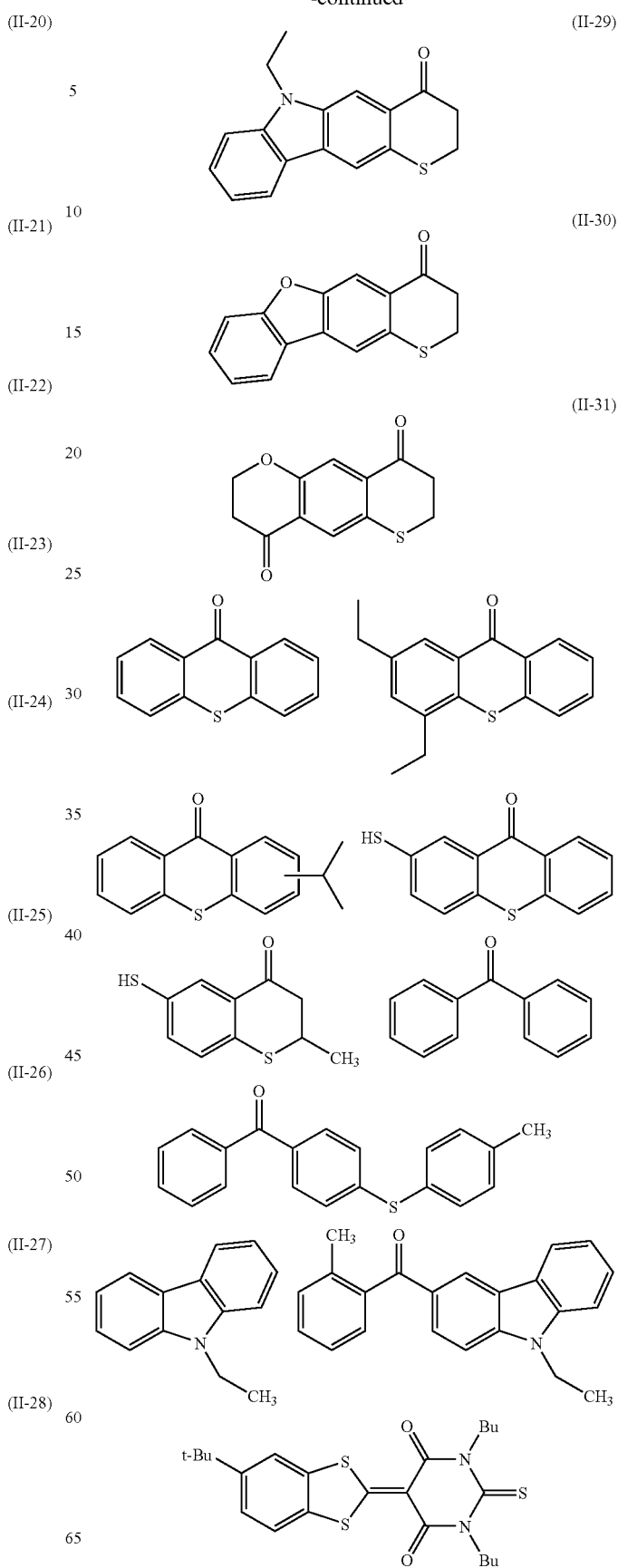

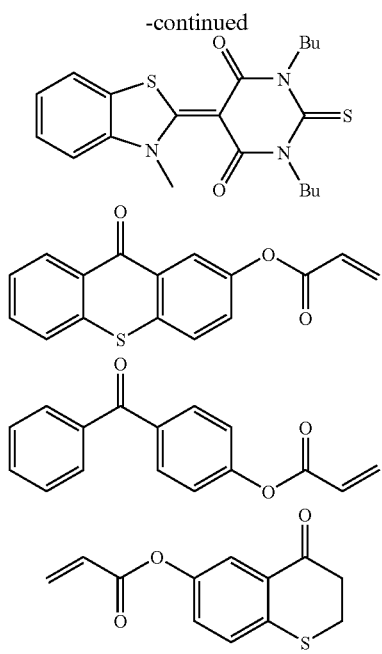

<(ii) Photopolymerization Initiator>

The ink composition of the invention contains a photopolymerization initiator.

As for the photopolymerization initiator of the invention, a publicly known photopolymerization initiator can be used. As a photopolymerization initiator of the invention, a radical polymerization initiator is preferably used.

The photopolymerization initiator can be used alone or in combination of two or more.

—Radical Polymerization Initiator—

Examples of a preferred radical polymerization initiator which can be contained in the ink composition of the invention include (a) aromatic ketones, (b) acylphosphine compounds, (c) aromatic onium salt compounds, (d) organic peroxides, (e) thio compounds, (f) hexaarylbiimidazole compounds, (g) ketoxime ester compounds, (h) borate compounds, (i) azinum compounds, (j) metallocene compounds, (k) active ester compounds, (l) compounds having carbon-halogen bond, and (m) alkyl amine compounds and the like.

Examples of the radical polymerization initiator described above include those described in paragraph No. (0135) to (0208) in JP-A No. 2006-085049.

As a suitable radical polymerization initiator, those selected from the group consisting of compounds having carbon-halogen bond, ketoxime ester compounds, α-amino ketones and acylphosphine oxides can be mentioned. Among these, in terms of curing sensitivity, α-amino ketones and acylphosphine oxides are preferred.

As a compound having carbon-halogen bond, triazine type compounds can be mentioned. Examples thereof include those described in JP-A No. 8-269049, Japanese Patent Application National Publication (Laid-Open) No. 2005-503545, J. Am. Chem. Soc. 1999, 121, pp. 6167 to 6175.

Examples of ketoxime compounds include the compounds disclosed in JP-A No. 2007-231000, Japanese Patent Application National Publication (Laid-Open) No. 2006-516246, JP-A Nos. 2001-233842, 2004-534797, 2005-097141, 2006-342166.

Examples of α-amino ketone compounds include 2-methyl-1-phenyl-2-morpholinopropan-1-one, 2-methyl-1-[4-(hexyl)phenyl]-2-morpholinopropan-1-one, 2-ethyl-2-dimethylamino-1-(4-morphoplinophenyl)-butanone-1. In addition, IRGACURE series that are manufactured by Ciba-Geigy Company, i.e., IRGACURE 907, IRGACURE 369, IRGACURE 379 and the like, are commercially obtainable, and as belonging to the α-amino ketones, they can be suitably used for the invention.

Examples of acylphosphine oxide compounds include the compound that are disclosed in JP-B Nos. 63-40799, 5-29234, JP-A Nos. 10-95788, and 10-29997. In addition, as an example of a compound belonging to acylphosphine oxide compounds, IRGACURE series and DAROCUR series, that are manufactured by Ciba-Geigy Company, i.e., IRGACURE 819, IRGACURE 1800, IRGACURE 1870, DAROCUR TPO and the like, are commercially obtainable and can be suitably used for the invention.

Content of the polymerization initiator included in the inkjet ink composition of the invention is, relative to the total weight of the ink composition, preferably in the range of 0.1% by weight to 30% by weight, more preferably in the range of 1.0% by weight to 20% by weight, and still more preferably in the range of 3.0% by weight to 15.0% by weight.

Content of the photopolymerization initiator included in the ink composition of the invention is preferably in an amount of 0.01 to 35 parts by weight, more preferably 0.1 to 30 parts by weight, and still more preferably 0.5 to 20 parts by weight compared to 100 parts by weight of the (iii) polymerizable compound having an ethylenic unsaturated bond, that will be described below. In addition, herein, the content of the photopolymerization initiator means the total content of photopolymerization initiator including such as radical polymerization initiator described above, that is contained in the inkjet ink composition.

<(iii) Polymerizable Compound Having an Ethylenic Unsaturated Bond>

The ink composition of the invention contains a polymerizable compound having an ethylenic unsaturated bond. The polymerizable compound which can be appropriately used for the invention is a compound which has an ethylenic unsaturated bond capable of undergoing radical polymerization. Any compound which has in its molecule at least one ethylenic unsaturated bond capable of undergoing radical polymerization can be used, and it includes those having chemical form such as monomer, oligomer, polymer, and the like.

The radical polymerizable compound can be used alone or in combination of two or more in any ratio to improve a desired property. Preferably, it is used in combination of two or more to control its performance such as reactivity, physical properties, and the like.

Examples of a polymerizable compound having an ethylenic unsaturated bond include unsaturated carboxylic acid such as acrylic acid, methacylic acid, itaconic acid, crotonic acid, isocrotonic acid, maleic acid, and their salts, anhydrides having ethylenic unsaturated group, acrylonitrile, styrene, and further other radical polymerizable compounds including various unsaturated polyester, unsaturated polyether, unsaturated polyamide, unsaturated urethane and the like.

Specific examples include acrylate derivatives such as 2-ethylhexylacrylate, 2-hydroxyethylacrylate, butoxyethylacrylate, carbitolacrylate, cyclohexylacrylate, tetrahydrofurfurylacrylate, benzylacrylate, bis(4-acryloxypolyethoxyphenyl)propane, neopentyl glycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, polypropylene glycol diacrylate, pentaerythritol triacrylate, pentaerythritol tetraacrylate, dipentaerythritol tetraacrylate, trimethylolpropane triacrylate, tetramethylolmethane tetraacrylate, oligoester acrylate, N-methylol acrylamide, diacetone acrylamide, epoxyacrylate or the like, methacrylate derivatives such as methylmethacrylate, n-butylmethacrylate, 2-ethylhexylmethacrylate, laurylmethacrylate, arylmethacrylate, glicidylmethacrylate, benzylmethacrylate, dimethylaminomethylmethacrylate, 1,6-hexanediol dimethacrylate, ethylene glycol dimethacrylate, triethylene glycol dimethacrylate, polyethylene glycol dimethacrylate, polypropylene glycol dimethacrylate, trimethylol ethane trimethacrylate, trimethylol propane trimethacrylate, 2,2-bis(4-methacryloxypolyethoxyphenyl)propane or the like, and derivatives of an aryl compound such as arylglycidyl ether, diallylphthalate, triaryltrimelitate or the like. More specific examples include a commercially available product disclosed in Yamashita Shinzo ed., "Handbook for Cross Linking Agent", (1981, TAISEISHA LTD); Kato Kiyomi ed., "Handbook for UV•EB Curing (Reacting Material)" (1985, Polymer Publication); RadTech Research ed., "Application and Market for UV•EB curing Techniques", pp 79, (1989, CMC); Takiyama Eiichiro, "Handbook for Polyester", (1988, NIKKAN KOGYO SHIMBUN, LTD) or a radical polymerizable or cross-linking monomer, oligomer or polymer that are known in the pertinent art.

An example of a radical polymerizable compound includes a photocurable radical polymerizable compound which is disclosed in publications including JP-A No. 7-159983, JP-B No. 7-31399, JP-A Nos. 8-224982, 10-863, 9-134011 and used for a photopolymerizable composition.

In order to further improve sensitivity, permeation, and adhesiveness to a recording medium, it is preferable that monoacrylate is used together with a polyfunctional acrylate monomer or polyfunctional acrylate oligomer having molecular weight of 400 or more, preferably 500 or more as a radical polymerizable compound. In particular, for an ink composition which is used for recording on a flexible recording medium such as PET film or PP film, the combined use of the monoacrylate that is selected from the compound group and the polyfunctional acrylate monomer or polyfunctional acrylate oligomer is preferable in that it can provide plasticity to a film, and as a result adhesiveness is improved and also film strength is increased.

In addition, an aspect in which at least three kinds of polymerizable compound like a monofunctional, a bifunctional, a trifunctional monomer. are also used and is preferable in that, not only stability is maintained, but also sensitivity, permeation, and adhesiveness to a recording medium can be further improved.

As for monoacrylate, stearyl acrylate, isoamyl acrylate, isomyristyl acrylate, and isostearyl acrylate are preferable as they have high sensitivity, can prevent occurrence of curl by having low shrinking property, and also they are useful for preventing permeation, and malodor of a printed material, and can reduce cost required for an irradiation device.

As for an oligomer which can be used together with monoacrylate, epoxyacrylate oligomer and urethane acrylate oligomer are particularly preferred.

In addition, compared to acrylate, methacrylate has less skin irritation.

Among the compounds, when alkoxyacrylate is used in an amount of less than 70% by weight while acrylate is used for the remaining, it is preferable that good sensitivity, penetrating property and malodor property can be obtained.

Total content of the polymerizable compound having an ethylenic unsaturated bond in the inkjet ink composition of the invention is, relative to the total weight of the inkjet ink composition, 5 to 97% by weight, and more preferably 30 to 95% by weight.

<Colorant>

The ink composition of the invention may contain a colorant having diverse colors.

The colorant which can be used in the invention is not specifically limited. However, a pigment and an oil-soluble dye which has excellent anti-weatherability, and rich color reproducibility are preferred, and it can be selected from any known colorants such as a soluble dye. With respect to the colorant which can be suitably used for the ink composition of the invention, those not functioning as a polymerization inhibiting agent for a polymerization reaction as a curing reaction are preferred. This is because, sensitivity of a curing reaction by active radiation is not compromised by them.

[Pigment]

The pigment is not specifically limited. A commercially available organic pigment or an inorganic pigment, a dispersion in which pigment is dispersed in non-soluble resin as a dispersion medium, or a pigment of which surface is grafted with resin can be used. In addition, a resin particle dyed with a dye can be also used.

Examples of a pigment include those disclosed in Ito Seishirou ed., "Encyclopedia of Pigments" (published in 2000), W. Herbst, K. Hunger "Industrial Organic Pigments", JP-A Nos. 2002-12607, 2002-188025, 2003-26978, and 2003-342503.

Specific examples of organic pigment and inorganic pigment which can be used for the invention include, as a yellow color-exhibiting pigment, a monoazo pigment such as C. I. Pigment Yellow 1 (First Yellow G), C. I. Pigment Yellow 74, C. I. Pigment Yellow 120, a disazo pigment such as C. I. Pigment Yellow 155, C. I. Pigment Yellow 12 (disazo Yellow AAA), C. I. Pigment Yellow 17, a non-benzidine type azo pigment such as C. I. Pigment Yellow 180, an azo Lake pigment such as C. I. Pigment Yellow 100 (Tartrazine Yellow Lake), a condensed azo pigment such as C. I. Pigment Yellow 95 (condensed azo Yellow GR), an acidic dye Lake pigment such as C. I. Pigment Yellow 115 (quinoline Yellow Lake), a basic dye Lake pigment such as C. I. Pigment Yellow 18 (thioflavin Lake), an anthraquinone type pigment such as flavanthrone Yellow (Y-24), an isoindolinone pigment such as Yellow isoindolinone 3RLT (Y=110), a quinophthalone pigment such as quinophthalone Yellow (Y-138), an isoindoline pigment such as isoindoline Yellow (Y-139), a nitroso pigment such as C. I. Pigment Yellow 153 (nickel nitroso Yellow), a metal complex azomethine pigment such as C. I. Pigment Yellow 117 (copper azomethine Yellow).

As a red or magenta color-exhibiting pigment, a monoazo pigment such as C. I. Pigment Red 3 (Toluidine Red), a disazo pigment such as C. I. Pigment Red 38 (pyrazolone Red B), an azo Lake pigment such as C. I. Pigment Red 53:1 (Lake Red C) or C. I. Pigment Red 57:1 (brilliant carmine 6B), a condensed azo pigment such as C. I. Pigment Red 144 (condensed azo Red BR), an acidic dye Lake pigment such as C. I. Pigment Red 174 (floxin B Lake), a basic dye Lake pigment such as C. I. Pigment Red 81 (rhodamine 6G' Lake), an anthraquinone type pigment such as C. I. Pigment Red 177 (dianthraquononyl Red), a thioindigo pigment such as C. I. Pigment Red 88 (thioindigo bordeux), a perinone pigment such as C. I. Pigment Red 194 (perinone Red), a perylene pigment such as C. I. Pigment Red 149 (perylene scarlet), a quinacridone pigment such as C. I. Pigment Violet 19 (unsubstituted quinacridone), C. I. Pigment Red 122 (quinacridone magenta), an isoindolinone pigment such as C. I. Pigment Red 180 (isoindolinone Red 2BLT), an alizarin Lake pigment such as C. I. Pigment Red 83 (madder Lake) can be mentioned.

As a blue or cyan color-exhibiting pigment, a disazo type pigment such as C. I. Pigment Blue 25 (dicyanidin blue), a phthalocyanine pigment such as C. I. Pigment Blue 15 (phthalocyanine blue), an acidic dye Lake pigment such as C. I. Pigment Blue 24 (peacock blue Lake), a basic dye Lake pigment such as C. I. Pigment Blue 1 (Victoria pure blue BO Lake), an anthraquinone type pigment such as C. I. Pigment Blue 60 (indanthron blue), an alkali blue pigment such as C. I. Pigment Blue 18 (alkali blue V-5:1) can be mentioned.

As a green color-exhibiting pigment, a phthalocyanine pigment such as C. I. Pigment Green 7 (phthalocyanine green), C. I. Pigment Green 36 (phthalocyanine green), an azo metal complex pigment such as C. I. Pigment Green 8 (nitroso green) can be mentioned.

As an orange color-exhibiting pigment, an isoindoline pigment such as C. I. Pigment Orange 66 (isoindoline orange) and anthraquinone pigment such as C. I. Pigment Orange 51 (dichloropyranthrone orange) can be mentioned.

As a black color-exhibiting pigment, carbon black, titan black, aniline black can be mentioned.

Specific examples of a white pigment which can be used include, basic lead carbonate ($2PbCO_3Pb(OH)_2$, so-called, silver white), zinc oxide (ZnO, so-called, zinc white), titanium oxide ($TiO_2$, so-called, titanium white), strontium titanate ($SrTiO_3$, so-called, strontium titanium white).

Herein, compared to other white pigments, titanium oxide has low specific gravity, high refractive index, and is chemically and physically stable. Thus, it has high shielding power and coloring property as a pigment, and also has excellent durability to acid, alkali and other environmental factors. As such, as a white pigment, titanium oxide is preferably used. However, if necessary, other white pigments (including those not described above for the white pigment) can be used.

For dispersion of a pigment, an apparatus for dispersion such as a ball mill, a sand mill, an attritor mill, a roll mill, a jet mill, a homogenizer, a paint shaker, a kneader, an agitator, a Hentschel mixer, a colloid mill, an ultrasonic homogenizer, a pearl mill, a wet jet mill and the like can be used.

A dispersant can be also added for performing dispersion of a pigment. As a dispersant, carboxylic acid ester containing a hydroxy group, high molecular weight acid ester salt with long-chain polyaminoamide, high molecular weight polycarboxylic acid salt, high molecular weight unsaturated acid ester, high molecular weight copolymer, modified polyacrylate, aliphatic polyvalent carboxylic acid, naphthalene sulfonic acid formalin condensate, polyoxyethylene alkyl phosphoric acid ester, derivatives of a pigment and the like can be mentioned. In addition, a commercially available polymer dispersant such as Solsperse series (Noveon) can be also preferably used.

In addition, as an aid for dispersion, a synergist for each pigment can be also used. These dispersant and dispersion aid are preferably added in an amount of 1 part by weight to 50 parts by weight compared to 100 parts by weight of a pigment.

For the ink composition of the invention, as a medium for dispersion of the components such as pigment, a solvent can be added. In addition, the (i) polymerizable compound which is free of any solvent and is a low-molecular weight component can be utilized as a medium for dispersion. However, since the inkjet ink composition that is applied for the inkjet ink composition of the invention is radiation curing type ink and is cured after the inkjet ink composition is applied on a recording medium, it is preferably free of any solvent. This is because, when a solvent remains in a cured ink image, resistance to solvent is impaired or a VOC (Volatile Organic Compound) problem derived from remaining solvent may occur. From such view point, the polymerizable compound is used as a medium for dispersion, and especially the polymerizable monomer having the lowest viscosity is preferably selected and used in terms of obtaining proper dispersion and improving handlability of the inkjet ink composition.

Mean particle diameter of the pigment is preferably in the range of 0.02 μm to 0.9 μm, more preferably in the range of 0.05 μm to 0.8 μm and still more preferably in the range of 0.06 μm to 0.6 μm.

A pigment, a dispersant, a medium for dispersion, condition for dispersion and condition for filtration are chosen to obtain the mean particle diameter of the pigment particle in the preferred range. By controlling the mean particle diameter, when the ink composition of the invention is applied for inkjet recording, clogging of a head nozzle can be inhibited, and storage stability of the ink, transparency and curing sensitivity of the ink can be appropriately maintained.

[Dyes]

The dye which can be used for the invention is preferably oil-soluble. Specifically, it indicates that it has water solubility (weight of pigment which dissolves in 100 g water) of 1 g or less at 25° C., preferably 0.5 g or less and more preferably 0.1 g or less. Therefore, so-called water-insoluble and oil-soluble dyes are preferably used.

In order for obtaining dissolution of a required amount in the ink composition of the invention, the dye which can be used for the invention may preferably have a group for oil dissolution in its main core structure.

Examples of a group for oil dissolution include, a long chain, branched alkyl group, a long chain, branched alkoxy group, a long chain, branched alkylthio group, a long chain, branched alkylsulfonyl group, a long chain, branched acyloxy group, a long chain, branched alkoxycarbonyl group, a long chain, branched acyl group, a long chain, branched acylamino group, a long chain, branched alkylsulfonylamino group, a long chain, branched alkylaminosulfonyl group and an aryl group, an aryloxy group, an aryloxycarbonyl group, an arylcarbonyloxy group, an arylaminocarbonyl group, an arylaminosulfonyl group, an arylsulfonylamino group including these long chain, branched substituent groups.

In addition, to obtain a dye, a carboxylic acid or a sulfonic acid included in a water-soluble dye can be converted into an oil-soluble group such as an alkoxycarbonyl group, an aryloxycarbonyl group, an alkylaminosulfonyl group, an arylaminosulfonyl group. by using a long chain, branched alcohol, amine, phenol or aniline derivative.

As for oil-soluble dye, those having melting point of 200° C. or less are preferable. Those having melting point of 150° C. or less are more preferable and those having melting point of 100° C. or less are still more preferable. By using a oil-soluble dye having low melting point, crystal precipitation of a pigment in the ink composition is inhibited, and therefore storage stability of a photocured product is improved.

In addition, in order to improve resistance to discoloration and an oxidizing substance, in particular ozone, and to improve a curing property, those having noble oxidation potential are preferable. As such, as an oil-soluble dye that is used for the invention, a dye having oxidation potential of 1.0V (vs SCE) or more is preferably used. Higher oxidation potential is preferred. A dye having oxidation potential of 1.1V (vs SCE) or more is more preferred. A dye having oxidation potential of 1.15V (vs SCE) or more is still more preferred.

As a yellow color dye, the compound that is represented by the Formula (Y-I) described in JP-A No. 2004-250483 is preferred.

More preferred dyes are those represented by the Formulae (Y-II) to (Y-IV) in paragraph (0034) of JP-A No. 2004-250483. Specific examples include the compound described in paragraphs (0060) to (0071) in JP-A No. 2004-250483. In addition, the oil-soluble dye having the Formula (Y-I) disclosed in the publication can be used not only for yellow ink but also for any color ink including black ink, red ink.

As a magenta color dye, the compound that is represented by the Formulae (3) and (4) in JP-A No. 2002-114930 is preferred. Specific examples include the compound described in paragraphs (0054) to (0073) in JP-A No. 2002-114930.

More preferred dyes are azo dyes that are represented by the Formulae (M-1) to (M-2) in paragraphs (0084) to (0122) of JP-A No. 2002-121414. Specific examples include the compound described in paragraphs (0123) to (0132) in JP-A No. 2002-121414. In addition, the oil-soluble dye having the Formulae (3), (4), (M-1) to (M-2) disclosed in the publication can be used not only for magenta ink but also for any color ink including black ink, red ink.

As a cyan color dye, the dye that is represented by the Formulae (I) to (IV) in JP-A No. 2001-181547, and the dye that is represented by the Formulae (IV-1) to (IV-4) in paragraphs (0063) to (0078) of JP-A No. 2002-121414 are preferred. Specific examples include the compound described in paragraphs (0052) to (0066) in JP-A No. 2001-181547 and in paragraphs (0079) to (0081) in JP-A No. 2002-121414.

More preferred dyes are phthalocyanin dyes that are represented by the Formulae (C-I) and (C-II) in paragraphs (0133) to (0196) of JP-A No. 2002-121414. The phthalocyanin dye that is represented by the Formula (C-II) is still more preferred. Specific examples include the compound described in paragraphs (0198) to (0201) in JP-A No. 2002-121414. In addition, the oil-soluble dye having the Formulae (I) to (IV), (IV-1) to (IV-4), (C-I) and (C-II) can be used not only for cyan ink but also for any color ink including black ink, green ink.

—Oxidation Potential—

Oxidation potential (Eox) of the dye of the invention can be easily measured by a skilled person in the art. The method is described, for example, in P. Delahay "New Instrumental Methods in Electrochemistry" (1954, Interscience Publishers) or A. J. Bard and others "Electrochemical Methods" (1980, John Wiley & Sons), or Fujishima Akira and others "Electrochemical Measurement" (1984, Gihodo Shuppan Co., Ltd).

Specifically, oxidation potential is measured according to the process as follows: in a solvent such as dimethylformamide or acetonitrile which includes a supporting electrolyte like sodium hyperchlorite or tetrapropylammonium hyperchlorite, a test sample is dissolved to $1 \times 10^{-2}$ to $1 \times 10^{-6}$ mole/liter, an oxidation wave is approximated to a straight line when sweeping is applied to an oxidation side (i.e., higher side) using a cyclic voltametry or a direct current polarography device by having carbon (GC) as an action electrode and a rotating platinum electrode as an opposing electrode, and measuring a medium potential value of a line that is obtained by connecting the cross point between the straight line and residual current•voltage and the cross point between the straight line and a saturated current line (or a cross point with a line which is parallel to the vertical line having peak potential value), in which the medium potential is obtained relative to SCE (saturated calomel electrode). This value may have an error of several tens of milivolts due to potential difference in separate liquids and liquid resistance of a sample solution. However, by adding a standard sample (for example, hydroquinone), potential reproducibility can be maintained. In addition, as for the supporting electrolyte and the solvent, they can be appropriately selected depending on oxidation potential or solubility of a sample to be tested. With respect to the supporting electrolyte and the solvent which can be used, those described at pages 101 to 118 of "Electrochemical Measurement" by Fujishima Akira and others (1984, Gihodo Shuppan Co., Ltd) can be mentioned.

The colorants are added to the ink composition preferably in an amount of 1% by weight to 30% by weight and more preferably in an amount of 2% by weight to 25% by weight compared to the total weight of the ink composition.

The ink composition of the invention may include other components addition to the each component described above for improving its physical properties, if the effect of the invention is not impaired.

Herein below, these optional components will be explained in greater detail.

<Co-Sensitizer>

The ink composition of the invention may contain a co-sensitizer. According to the invention, the co-sensitizer can further improve sensitivity of a sensitizer to active radiation or prevent polymerization inhibition of a polymerizable compound by oxygen.

Examples of a co-sensitizer include amines, the compounds disclosed in M. R. Sander including "Journal of Polymer Science" Vol. 10, page 3173 (1972), JP-B No. 44-20189, JP-A Nos. 51-82102, 52-134692, 59-138205, 60-84305, 62-18537, 64-33104, and Research Disclosure No. 33825. Specific examples include triethanolamine, p-dimethylamino benzoic acid ethyl ester, p-formyl dimethylaniline, p-methyl thiodimethylaniline and the like.

Other examples of a co-sensitizer include thiols and sulfides, a thiol compound disclosed in JP-A No. 53-702, JP-B No. 55-500806, JP-A No. 5-142772, a disulfide compound disclosed in JP-A No. 56-75643 and the like. Specific examples include 2-mercaptobenzothiazole, 2-mercaptobenzoxazole, 2-mercaptobenzimidazole, 2-mercapto-4(3H)-quinazoline, and β-mercaptonaphthalene can be mentioned.

Further, other examples of a co-sensitizer include an amino acid compound (e.g., N-phenylglycine), an organometallic compound disclosed in JP-B No. 48-42965 (e.g., tributyl tin acetate), a hydrogen donor disclosed in JP-B No. 55-34414, a sulfur compound disclosed in JP-A No. 6-308727 (e.g., trithiane), a phosphorous compound disclosed in JP-A No. 6-250387 (diethylphosphite), Si—H, Ge—H compound disclosed in JP-A No. 8-65779.

<UV Absorbing Agent>

The ink composition of the invention may include a UV absorbing agent, in terms of improving anti-weatherability and preventing discoloration of an image.

Examples of a UV absorbing agent include a benzotriazole compound disclosed in JP-A Nos. 58-185677, 61-190537, 2-782, 5-197075, and No. 9-34057, a benzophenone compound disclosed in JP-A Nos. 46-2784, 5-194483, and U.S. Pat. No. 3,214,463, a cinnamic acid compound disclosed in JP-B Nos. 48-30492, 56-21141, JP-A No. 10-88106, a triazine compound disclosed in JP-A Nos. 4-298503, 8-53427, 8-239368, 10-182621, Japanese Patent Application National Publication (Laid-Open) No. 8-501291, a compound disclosed in Research disclosure No. 24239, or a compound which absorbs UV ray and emits fluorescence, e.g., so-called fluorescence brightening agent such as stilbene and benzoxazole compound.

Addition amount of the UV absorbing agent is suitably selected depending on specific purpose. Converted into a solid matter, it is preferably included in an amount of 0.5% by weight to 15% by weight.

<Anti-Oxidation Agent>

In order to improve stability, the ink composition of the invention may be added with an anti-oxidation agent.

As an anti-oxidation agent, those disclosed in EP Laid-Open No. 223739, EP Laid-Open No. 309401, EP Laid-Open No. 309402, EP Laid-Open No. 310551, EP Laid-Open No. 310552, EP Laid-Open No. 459-416, DE Laid-Open No. 3435443, JP-A Nos. 54-48535, 62-262047, 63-113536, 63-163351, 2-262654, 2-71262, 3-121449, 5-61166, 5-119449, U.S. Pat. No. 4,814,262, U.S. Pat. No. 4,980,275 can be mentioned.

Addition amount of the anti-oxidation agent is suitably selected depending on specific purpose. Converted into a solid matter, it is preferably included in an amount of 0.1% by weight to 8% by weight.

<Anti-Discoloring Agent>

The ink composition of the invention may include various organic and metal complex type anti-discoloring agent.

As an organic anti-discoloring agent, hydroquinones, alkoxyphenols, dialkoxyphenols, phenols, anilines, amines, indanes, chromanes, alkoxyanilines, heterocycles and the like can be obtained.

Further, as a metal complex type anti-discoloring agent, a nickel complex, a zinc complex and the like can be mentioned. Specifically, the compounds disclosed in the patent documents that are cited in Section I to J in Chapter VII of Research Disclosure No. 17643, Research Disclosure No. 15162, Research Disclosure No. 18716, page 650 left column, Research Disclosure No. 36544, page 527, Research Disclosure No. 307105, page 872, or Research Disclosure No. 15162, and the compound included in representative formula which is described at pages 127 to 137 of JP-A No. 62-215272 and the compounds included in the example of the compounds can be used.

Addition amount of the anti-discoloring agent is suitably selected depending on specific purpose. Converted into a solid matter, it is preferably included in an amount of 0.1% by weight to 8% by weight.

<Conductive Salts>

To control a jetting property, the ink composition of the invention may add conductive salts such as potassium thiocyanate, lithium acetate, ammonium thiocyanate, dimethylamine hydrochloric acid salt.

<Solvent>

To improve adhesiveness to a recording medium, the ink composition of the invention may effectively add an extremely small amount of organic solvent.

Examples of a solvent include a ketone solvent such as acetone, methylethyl ketone, diethyl ketone, an alcohol solvent such as methanol, ethanol, 2-propanol, 1-propanol, 1-butanol, tert-butanol, a chlorine solvent such as chloroform, methylene chloride, an aromatic solvent such as benzene, toluene, an ester solvent such as ethyl acetate, butyl acetate, isopropyl acetate, an ether solvent such as diethyl ether, tetrahydrofuran, dioxane, and a glycol ether solvent such as ethylene glycol monomethyl ether, ethylene glycol dimethyl ether.

In this case, addition can be effectively made within the range that problems like solvent resistance or VOC do not occur. The addition amount is preferably 0.1% by weight to 5% by weight, and more preferably 0.1% by weight to 3% by weight compared to the total weight of the inkjet ink composition.

<Polymer Compound>

To control a physical property of a film, the ink composition of the invention may add various polymer compounds.

As a polymer compound, an acrylate polymer, a polyvinyl butyral resin, a polyurethane resin, a polyamide resin, a polyester resin, an epoxy resin, a phenol resin, a polycarbonate resin, a polyvinyl butyral resin, a polyvinyl formal resin, Shelloc, a vinyl resin, an acrylate resin, a rubber resin, wax, and other natural resin and the like can be used. Further, it can be used in combination of two or more. Among these, a vinyl copolymer which is obtained by copolymerization of an acrylic monomer is preferred. In addition, as a copolymer composition for polymer binding agent, a copolymer which includes a "carboxy group-containing monomer", "methacrylate alkyl ester" or "acrylic acid alkyl ester" can be also preferably used.

<Surface Active Agent>

A surface active agent can be added to the ink composition of the invention.

As a surface active agent, those described in publications of JP-A Nos. 62-173463 and 62-183457 can be mentioned. Examples thereof include an anionic surface active agent such as dialkylsulfosuccinate salts, alkylnaphthalene sulfonates salts, fatty acid salts, a non-ionic surface active agent such as polyoxyethylenealkyl ethers, polyoxyethylenealkylaryl ethers, acetylene glycols, polyoxyethylenepolyoxypropylene block copolymer, and a cationic surface active agent such as alkylamine salts, quaternary ammonium salts.

In addition, instead of a surface active agent, an organofluoro compound can be used.

The organofluoro compound is preferably hydrophobic. Examples of an organofluoro compound include a fluorine surface active agent, an oil type fluorine compound (e.g., fluorine oil), a solid type fluorine compound resin (e.g., tetrafluoroethylene resin) and those disclosed in publications of JP-B No. 57-9053 ($8^{th}$ to $17^{th}$ column) and JP-A No. 62-135826.

<Other Components>

In addition to the components described above, if necessary, the ink composition of the invention may contain a leveling additive, a mattifying agent, wax for controlling physical property of a film, a tackifying agent such as polyolefin or PET which can prevent polymerization to improve adhesiveness to a recording medium.

Specific examples of a tackifying agent include an adhesive polymer having high molecular weight that is disclosed at pages 5 to 6 of JP-A No. 2001-49200 (for example, a copolymer which consists of an ester of (meth)acrylic acid with an alcohol having an alkyl group with 1 to 20 carbon atoms, an ester of (meth)acrylic acid with an alicyclic alcohol having 3 to 14 carbon atoms, or an ester of (meth)acrylic acid with an aromatic alcohol having 6 to 14 carbon atoms), a low molecular weight resin having polymerizable unsaturated bond which can provide adhesiveness can be mentioned.

<Properties of the Ink Composition>

As described above, the ink composition of the invention is required to contain (i) the specific sensitizer, (ii) a photopolymerization initiator, and (iii) a polymerizable compound having an ethylenic unsaturated bond. In addition, it may contained other sensitive agent, a colorant and the like as an optional component.

With respect to these components, a colorant is included preferably in an amount of 1 to 30% by weight, and more preferably in an amount of 2 to 25% by weight, relative to the total weight of the ink composition. The polymerizable compound is included preferably in an amount of 5 to 97% by weight, and more preferably in an amount of 30 to 95% by weight in total. The photopolymerization initiator is contained within the range of 0.1 to 30% by weight, preferably within the range of 1.0 to 20% by weight, and more preferably within the range of 3.0 to 15.0% by weight.

—Physical Properties of the Inkjet Ink Composition—

The ink composition of the invention is suitably used as an inkjet ink composition for inkjet recording. Preferred physical properties for an aspect of using the ink composition for inkjet recording are explained below.

The composition ratio of the inkjet ink composition of the invention is appropriately adjusted to have viscosity at 25° C. in the range of 5 mPa·s to 100 mPa·s. Within this range, the combination of the specific sensitizer of the invention and a photopolymerization initiator functions particularly effectively. That is, by having the viscosity of the inkjet ink composition in the range of 5 mPa·s to 100 mPa·s, the curability of the ink composition, the physical properties of a cured film, and the jetting properties of the ink are all improved. In terms of jetting properties, the viscosity of the inkjet ink composition at the jetting temperature (for example, from 40 to 80° C., preferably from 25 to 50° C.) is preferably 5 mPa·s to 30 mPa·s, and more preferably 5 mPa·s to 20 mPa·s.

The viscosity of the inkjet ink composition of the invention at 25° C. is preferably 5 mPa·s to 50 mPa·s, more preferably 5 mPa·s to 30 mPa·s, and still more preferably 10 mPa·s to 25 mPa·s.

The surface tension of the inkjet ink composition of the invention is preferably in the range of 20 mN/m to 30 mN/m, and more preferably in the range of 23 mN/m to 28 mN/m. When recording is performed on various recording medium such as polyolefin, PET, a coated paper, and a non-coated paper, the surface tension is preferably 20 mN/m or more in view of permeation and penetration. In terms of wettability, it is preferably 30 mN/m or less.

The inkjet ink composition of the invention is suitably used for an inkjet recording method wherein the ink composition is jetted onto a recording medium by inkjet printer, and the jetted inkjet ink composition is irradiated with active radiation, thereby the ink composition is cured for recording.

[Inkjet Recording Method]

Next, the inkjet recording method of the invention and an inkjet recording device which can be employed for the recording method will be explained.

The inkjet recording method of the invention is a method in which the inkjet ink composition of the invention is jetted onto a recording medium (a support, a recording material), active radiation is irradiated on the inkjet ink composition which has been jetted onto the recording medium, and the inkjet ink composition is cured.

Specifically, the inkjet recording method of the invention includes (1) jetting the inkjet ink composition of the invention onto a recording medium, and (2) irradiating active radiation to the jetted ink composition and curing the inkjet ink composition.

According to the inkjet recording method of the invention, by including the above step (1) and step (2), an image is formed with the inkjet ink composition which has been cured on a recording medium.

For the step (1) of the inkjet recording method of the invention, the inkjet recording device which is described in detail herein below can be used.

<Inkjet Recording Device>

The inkjet recording device used for the recording method of the invention is not specifically limited. Any well known inkjet recording device which can provide desired resolution can be selected and used. That is, any well known inkjet recording device including commercially available ones can be used for jetting ink onto a recording medium in step (1) of the inkjet recording method of the invention.

As for an inkjet recording device which can be used for the invention, a device equipped with an ink supplier, a temperature sensor, and a source for active radiation can be mentioned, for example.

The ink supplier consists of, for example, an original tank which includes the inkjet ink composition of the invention, a supply pipe, an ink supply tank right before an inkjet head, a filter, and a Piezo type inkjet head. A piezo type inkjet head can be operated to jet multi-size dots of 1 pl to 100 pl, preferably 8 pl to 30 pl, with resolution of 320×320 to 4000× 4000 dpi, preferably 400×400 to 1600×1600 dpi, and more preferably 720×720 dpi, for example. In addition, the "dpi" described in the present specification indicates the number of dots per 2.54 cm.

As described above, the radiation curable ink is desirably jetted at constant temperature. As such, thermal insulation and heating may be applied to a region from an ink supply tank to an inkjet head. A method of controlling temperature is not specifically limited. For example, a multiple number of thermometer sensor is placed on different regions of each pipe, and heating control is preferably carried out depending on ink flow amount and environmental temperature. The temperature sensor can be placed near nozzles of an ink supply tank and an inkjet head. In addition, it is preferable that the head unit, which is to be heated, is thermally insulated or shielded so that the main body of a device is not affected by the outside air temperature. To reduce a printer running time required for heating, or to reduce any loss in heat energy, it is preferable that thermal insulation from other parts is maintained and at the same time the heat capacity of a heating unit itself is designed to be small.

Next, the step (2) in which active radiation is irradiated on the jetted inkjet ink composition, and then the ink composition is cured will be explained.

The inkjet ink composition jetted onto a recording medium is cured by irradiation with active radiation. This is because, (ii) the photopolymerization initiator included in the ink composition of the invention is degraded by irradiation of active radiation, and generates initiation species such as radical, acid, base, which cause and promote a polymerization reaction of (iii) a polymerizable compound having an ethylenic unsaturated bond to cure the ink composition of the invention. In this case, as (i) the specific sensitizer is present together with the photopolymerization initiator in the ink composition of the invention, the sensitizer in the system absorbs active radiation to be in an excited state and becomes to have contact with the photopolymerization initiator. As a result, degradation of the photopolymerization initiator is promoted and a curing reaction with higher sensitivity can be achieved.

Herein, as active radiation, α ray, γ ray, electronic ray, X ray, UV ray, visible ray, or infrared ray and the like can be used. Peak wavelength of the active radiation varies depending on absorption characteristics of a sensitizer. For example, it is preferably in the range of 200 to 600 nm, more preferably in the range of 300 to 450 nm, and still more preferably in the range of 340 to 370 nm.

Further, the polymerization initiator contained in the ink composition of the invention has sensitivity that is sufficient even for active radiation with low output. Thus, output of active radiation is preferably 2,000 $mJ/cm^2$ or less, more preferably 10 $mJ/cm^2$ to 1,500 $mJ/cm^2$, and still more preferably 20 $mJ/cm^2$ to 1,000 $mJ/cm^2$.

Further, the active radiation is irradiated with surface exposure illuminance intensity of 10 $mW/cm^2$ to 2,000 $mW/cm^2$, and preferably 20 $mW/cm^2$ to 1,000 $mW/cm^2$, for example.

As a source for active radiation, a mercury lamp, or gas•solid laser is mainly used. As a light source used for curing UV photocurable inkjet recording ink, a mercury lamp and a metal halide lams have been widely known. However, in view of current movement of environment protection, a mercury-free system is strongly desired. In this regard, replacement with GaN type semiconductor UV emitting device is very useful both industrially and environmentally. In addition, LED (UV-LED) and LD (UV-LD) are considered as an important light source for a photocurable inkjet as they have a small size, long life-time and high efficiency and are rather inexpensive.

Further, a light emitting diode (LED) and a laser diode (LD) can be used as a source for active radiation. In particular, when UV ray source is required, UV LED and UV LD can be used. For example, purple LED, which has main emission spectrum in the wavelength range of 365 nm and 420 nm, is provided by Nichia Corporation. In addition, when a shorter wavelength is needed, U.S. Pat. No. 6,084,250 discloses LED which can emit active radiation having a peak in the range of 300 nm and 370 nm. Other types of UV LED can be also obtained and irradiation with different UV range can be achieved by using them. The active radiation source which is particularly preferred in the invention is UV-LED, more preferably UV-LED having a peak wavelength in the range of 340 to 370 nm.

Further, the maximum illuminance intensity of LED on a recording medium is preferably 10 mW/cm$^2$ to 2,000 mW/cm$^2$, more preferably 20 mW/cm$^2$ to 1,000 mW/cm$^2$, and still more preferably 50 mW/cm$^2$ to 800 mW/cm$^2$.

The inkjet ink composition of the invention is irradiated with the active radiation for 0.01 seconds to 120 seconds, preferably for 0.1 seconds to 90 seconds.

Condition for irradiation of active radiation and basic method for irradiation are disclosed in JP-A No. 60-132767. Specifically, light source is formed at both sides of a head unit including an inkjet device, and the head unit and the light source are scanned to carry out irradiation according to a so-called shuttle method. After landing of the ink, irradiation of active radiation is carried out with certain time interval (for example, 0.01 seconds to 0.5 seconds, preferably 0.01 seconds to 0.3 seconds, and more preferably 0.01 seconds to 0.15 seconds).

As the time between ink landing and the irradiation is controlled to be very short, permeation of the ink landed on a recording medium before curing can be prevented. In addition, even for a porous recording medium, since exposure can be made before the ink permeates into a deep region to which the light cannot reach, presence of residual unreacted monomer can be inhibited and as a result, malodor can be reduced.

Further, curing can be completed with other light source which does not require any operation. A method using light fiber or a method of irradiating UV light on a recording part by hitting collimated light on a mirror surface that is formed on a side of a head unit are disclosed in the pamphlet of the International Publication No. 99/54415. These curing methods can be also applied for the recording method of the invention.

By adopting the inkjet recording method as described above, dot diameter of ink landed on various recording medium having different wettability can be maintained at constant level, and therefore an improved image can be obtained. Further, in order to obtain a color image, it is preferable to overlap ink in order from the one having low brightness. By overlapping ink from the one having low brightness, irradiated light can more easily reach the ink at very bottom so that good curing sensitivity, reduced presence of residual monomer, reduced malodor, and improved adhesiveness are expected to be obtained. Further, although whole colors are jetted first and then exposure can be made, it is preferable that exposure is made for each color in terms of promoting curing.

As a result, the inkjet ink composition of the invention is cured with high sensitivity by irradiation with active radiation and forms a hydrophobic image on surface of a recording medium.

Herein, the source for active radiation and preferred radiation condition that are used for curing of the ink composition are the same as those described for the inkjet recording method above.

The ink composition of the invention can be cured with high sensitivity by irradiation with active radiation such as UV ray, and therefore can form a hydrophobic area which has excellent adhesiveness to a support and excellent film quality. Thus, in addition to formation or marking of a colored image, it can be applied for various uses including formation of an ink receiving layer (image part) on a planographic printing plate. By applying it for forming an ink receiving layer on a planographic printing plate, a planographic printing plate having high image quality and excellent printing durability can be also obtained.

As described above, the ink composition of the invention is useful for inkjet recording wherein curing is carried out by irradiation with active radiation. However, it is needless to say that the ink composition of the invention is also useful as a commonly used inkjet ink composition.

As described above, according to the invention, an ink composition which has high sensitivity to irradiation with active radiation, and excellent curing properties, blocking resistance and jetting stability, and an inkjet recording method using the ink composition, are provided.

EXAMPLES

Hereinbelow, the present invention is further explained in detail with reference of the following examples. However, the invention is not limited to these examples. Further, unless specifically described otherwise, the term "parts" indicates "parts by weight."

(Preparation of Pigment Dispersion)

Each component shown in Table 1 (unit; parts by weight) was mixed and stirred for an hour using a stirrer. The mixture obtained after stirring was dispersed using a bead mill and pigment dispersions was obtained for each color. With respect to dispersion condition, zirconia beads having diameter of 0.65 mm was filled with filling ratio of 70%, circumferential speed was 9 m/s, and dispersion time was 4 hours for magenta pigment A and 2 hours for others.

TABLE 1

|  | Cyan pigment A | Magenta pigment A | Yellow pigment A | Carbon black | Titanium dioxide | Dispersant A | Dispersant B | (parts by mass) Polymerizable compound A |
|---|---|---|---|---|---|---|---|---|
| Cyan pigment dispersion A | 30 | — | — | — | — | 20 | — | 50 |
| Magenta pigment dispersion A | — | 30 | — | — | — | 20 | — | 50 |

TABLE 1-continued

|  | Cyan pigment A | Magenta pigment A | Yellow pigment A | Carbon black | Titanium dioxide | Dispersant A | Dispersant B | (parts by mass) Polymerizable compound A |
|---|---|---|---|---|---|---|---|---|
| Yellow pigment dispersion A | — | — | 30 | — | — | 20 | — | 50 |
| Black pigment dispersion A | — | — | — | 40 | — | 25 | — | 35 |
| White pigment dispersion A | — | — | — | — | 60 | — | 5 | 35 |

Detailed descriptions of the pigment, dispersant and polymerizable compound shown in Table 1 are as follows.

Cyan pigment A: PB15:3 (IRGALITE BLUE GLO; manufactured by Ciba Specialty Chemicals)

Magenta pigment A: PV19 (CINQUASIA MAGENTA RT-355D; manufactured by Ciba Specialty Chemicals)

Yellow pigment A: PY155 (NOVOPERM YELLOW 4G-01; manufactured by Clariant K.K)

Carbon black: SPECIAL BLACK 250 (manufactured by Degussa)

Titanium dioxide: CR60-2 (manufactured by ISHIHARA SANGYO KAISHA, LTD)

Dispersant A: BYK-168 (manufactured by BYK-Chemie)

Dispersant B: Solsperse 36000 (manufactured by Noveon)

Polymerizable compound A: PEA (Phenoxyethylacrylate; manufactured by DAI-ICHI KOGYO SEIYAKU CO., LTD).

<Preparation of Inkjet Ink Composition>

Each component shown in Table 2 to Table 5 was mixed and dissolved under stirring to obtain an inkjet ink composition (Examples 1 to 18 and Comparative examples 1 to 5).

Further, the surface tension of these inkjet ink compositions was measured at liquid temperature of 25° C. based on Wilhelmy method using a surface tensiometer (CBVP-Z tensiometer, manufactured by Kyowa Interface Science Co., LTD). As a result, it was found that the surface tension of all the inkjet ink compositions was within the range of 23 mN/m to 25 mN/m.

Still further, the viscosity of these inkjet ink compositions was measured at 25° C. using an E type viscometer (manufactured by TOKI SANGYO. LTD). As a result, it was found that the viscosity of all the inkjet ink compositions was within the range of 10 mPa·s to 25 mPa·s.

TABLE 2

|  | (parts by weight) | | | | |
|---|---|---|---|---|---|
|  | Example 1 | Example 2 | Example 3 | Example 4 | Example 5 |
| White pigment dispersion A | 9.6 | | | | |
| Black pigment dispersion A | | 9 | | | |
| Magenta pigment dispersion A | | | 18 | | |
| Cyan pigment dispersion A | | | | 7 | |
| Yellow pigment dispersion A | | | | | 15 |
| Polymerizable compound A | 28.2 | 28.8 | 19.8 | 30.8 | 22.8 |
| Polymerizable compound B | 32 | 32 | 32 | 32 | 32 |
| Polymerizable compound C | 1 | 1 | 1 | 1 | 1 |
| Polymerizable compound D | 15 | 15 | 15 | 15 | 15 |
| Surface active agent A | 0.1 | 0.1 | 0.1 | 0.1 | 0.1 |
| Inhibiting agent A | 0.1 | 0.1 | 0.1 | 0.1 | 0.1 |
| Initiator A | 8 | 8 | 8 | 8 | 8 |
| Initiator B | 2 | 2 | 2 | 2 | 2 |
| Sensitizer I-8 | 4 | 4 | 4 | 4 | 4 |

TABLE 3

|  | (parts by weight) | | | | | |
|---|---|---|---|---|---|---|
|  | Example 6 | Example 7 | Example 8 | Example 9 | Example 10 | Example 11 |
| White pigment dispersion A | 9.6 | 9.6 | 9.6 | 9.6 | 9.6 | 9.6 |
| Polymerizable compound A | 30.2 | 30.2 | 30.2 | 28.2 | 28.2 | 28.2 |
| Polymerizable compound B | 32 | 32 | 32 | 32 | 32 | 32 |
| Polymerizable compound C | 1 | 1 | 1 | 1 | 1 | 1 |
| Polymerizable compound D | 15 | 15 | 15 | 15 | 15 | 15 |
| Surface active agent A | 0.1 | 0.1 | 0.1 | 0.1 | 0.1 | 0.1 |
| Inhibiting agent A | 0.1 | 0.1 | 0.1 | 0.1 | 0.1 | 0.1 |
| Initiator A | 8 | 8 | 8 | 8 | 8 | 8 |
| Initiator B | 2 | 2 | 2 | 2 | 2 | 2 |
| Initiator C | | | | | | |
| Initiator D | | | | | | |
| Initiator E | | | | | | |
| Sensitizer I-2 | 2 | | | | | |
| Sensitizer I-4 | | 2 | | | | |
| Sensitizer I-26 | | | 2 | | | |
| Sensitizer I-17 | | | | 4 | | |

TABLE 3-continued (parts by weight)

| | Example 6 | Example 7 | Example 8 | Example 9 | Example 10 | Example 11 |
|---|---|---|---|---|---|---|
| Sensitizer I-6 | | | | | 4 | |
| Sensitizer I-11 | | | | | | 4 |

TABLE 4

(parts by weight)

| | Example 12 | Example 13 | Example 14 | Example 15 | Example 16 | Example 17 | Example 18 |
|---|---|---|---|---|---|---|---|
| White pigment dispersion A | 9.6 | 9.6 | 9.6 | 9.6 | 9.6 | 9.6 | 9.6 |
| Polymerizable compound A | 28.2 | 28.2 | 28.2 | 28.2 | 28.2 | 28.2 | 28.2 |
| Polymerizable compound B | 32 | 32 | 32 | 32 | 32 | 32 | 32 |
| Polymerizable compound C | 1 | 1 | 1 | 1 | 1 | 1 | 1 |
| Polymerizable compound D | 15 | 15 | 15 | 15 | 15 | 15 | 15 |
| Surface active agent A | 0.1 | 0.1 | 0.1 | 0.1 | 0.1 | 0.1 | 0.1 |
| Inhibiting agent A | 0.1 | 0.1 | 0.1 | 0.1 | 0.1 | 0.1 | 0.1 |
| Initiator A | 8 | | | | 8 | 8 | 8 |
| Initiator B | 2 | 2 | 2 | 2 | 2 | 2 | 2 |
| Initiator C | | | 8 | | | | |
| Initiator D | | | | 8 | | | |
| Initiator E | | 8 | | | | | |
| Sensitizer I-2 | | | | | 2 | | |
| Sensitizer I-4 | | | | | | 2 | |
| Sensitizer I-12 | 4 | | | | | | |
| Sensitizer I-8 | | 4 | 4 | 4 | | | 2 |
| Sensitizer A | | | | | 2 | | 2 |
| Sensitizer B | | | | | | 2 | |

TABLE 5

(parts by weight)

| | Comparative Example 1 | Comparative Example 2 | Comparative Example 3 | Comparative Example 4 | Comparative Example 5 |
|---|---|---|---|---|---|
| White pigment dispersion A | 9.6 | 9.6 | 9.6 | 9.6 | 9.6 |
| Polymerizable compound A | 28.2 | 28.2 | 28.2 | 30.2 | 30.2 |
| Polymerizable compound B | 32 | 32 | 32 | 32 | 32 |
| Polymerizable compound C | 1 | 1 | 1 | 1 | 1 |
| Polymerizable compound D | 15 | 15 | 15 | 15 | 15 |
| Surface active agent A | 0.1 | 0.1 | 0.1 | 0.1 | 0.1 |
| Inhibiting agent A | 0.1 | 0.1 | 0.1 | 0.1 | 0.1 |
| Initiator A | 8 | 8 | 8 | 8 | |
| Initiator B | 2 | 2 | 2 | 2 | |
| Diethanolamine | | | | | 4 |
| Diethylthioxanthone | 4 | | | | |
| 2-Chlorothioxanthone | | 4 | | | |
| 1-Chloro-4-isopropoxythioxanthone | | | 4 | | |
| 2-Methoxythioxanthone | | | | 2 | |
| Sensitizer I-8 | | | | | 8 |

Detailed descriptions of the polymerizable compound, surface active agent, inhibiting agent (polymerization inhibiting agent) photopolymerization and sensitizer that are used in Table 2 to Table 5 are as follows.

Polymerizable compound A: PEA (Phenoxyethylacrylate; manufactured by DAI-ICHI KOGYO SEIYAKU CO., LTD)

Polymerizable compound B: DPGDA (Dipropylene glycol diacrylate; manufactured by DAICEL-CYTEC COMPANY, LTD)

Polymerizable compound C: A-TMPT (Trimethylolpropane triacrylate; manufactured by Shin-Nakamura Chemical Co., Ltd)

Polymerizable compound D: FA-512A (Dicyclopentenyl oxyethylacrylate; manufactured by Shin-Nakamura Chemical Co., Ltd)

Surface active agent A: BYK-307 (manufactured by BYK-Chemie, surface active agent)

Inhibiting agent A: FIRSTCURE ST-1 (manufactured by Albemarle Company)

Sensitizer A (compound having the following structure)

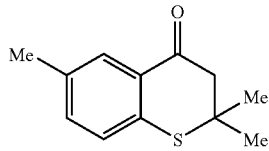 [SMILES: Cc1ccc2c(c1)C(=O)CC(C)(C)S2]

Sensitizer B (compound having the following structure)

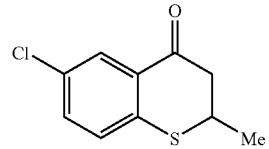 [SMILES: CC1CC(=O)c2cc(Cl)ccc2S1]

Initiator A: DAROCUR TPO (photopolymerization initiator manufactured by Ciba Specialty Chemicals)

Initiator B: IRGACURE 907 (photopolymerization initiator manufactured by Ciba Specialty Chemicals)

Initiator C: IRGACURE OXE01 (photopolymerization initiator manufactured by Ciba Specialty Chemicals)

Initiator D (compound having the following structure)

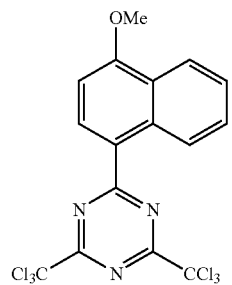

Initiator E: IRGACURE 819 (photopolymerization initiator manufactured by Ciba Specialty Chemicals)

Sensitizer I-2, I-3, I-6, I-8, I-11, I-12, I-17 and I-26 are specific examples of the specific sensitizer and they correspond to the compounds that are described in detail above.

With respect to the inkjet ink composition of Examples 1 to 18 and Comparative examples 1 to 5, jetting test was carried out according to an inkjet method. As a result, evaluation of curing sensitivity, blocking resistance, and jetting stability was made.

The inkjet ink composition obtained from each Example and Comparative example was dropped on a polyvinyl chloride sheet and irradiated with UV ray by passing the sheet under UV light emitting diode (UV-LED) at certain speed. As a result, the ink composition was cured and a printed material was obtained.

According to the example, jetting of the ink composition was performed by using a commercially available inkjet recording device which is equipped with a Piezo type inkjet nozzle. For a light emitting diode for curing (UV-LED), NCCU033 that is manufactured by Nichia Corporation. was used. The LED emits UV ray having wavelength of 365 nm per single chip, and with application of current of about 500 mA, about 100 mW light is emitted from the chip. Multiple chips are aligned at 7 mm interval to obtain power of 0.3 $W/cm^2$ on the surface of a recording medium (herein below, also referred to as medium). The time from dropping to light exposure and the light exposure time can be varied depending on return speed of the medium and the distance between the head and the LED return direction. According to the example, the exposure is carried out about 0.5 seconds after landing.

Depending on setting of a distance to medium and return speed, the light exposure energy on the medium can be adjusted to 0.01 to 15 $J/cm^2$.

Further, the ink supplier of the inkjet recording device used for the evaluation consists of an original tank, a supply pipe, an ink supply tank right before an inkjet head, a filter, and a piezo type inkjet head. The region from the ink supply tank to the inkjet head was thermally insulated and heated. The temperature sensor was installed near the ink supply tank and the inkjet head region, respectively. Temperature control was carried out to maintain the nozzle temperature constantly at 40° C.±2° C. The piezo type inkjet head was operated to jet multi-size dots of 8 μl to 30 μl, with resolution of 720×720 dpi. In addition, the "dpi" described in the present specification indicates the number of dots per 2.54 cm.

Then, the evaluation was carried out according to the following descriptions. Results are shown in Table 6.

<Curing Sensitivity (Tack-Free Sensitivity)>

Curing sensitivity was defined as the exposure energy required for avoiding a sticky surface after printing.

The presence or the absence of stickiness on a surface after printing was determined by pressing regular paper (C2 copying paper manufactured by Fuji Xerox Co., Ltd) on a freshly printed material. Specifically, when there was color staining on the paper, it was determined as "sticky", and when there was no color staining it was determined as "not sticky." A lower score indicates higher sensitivity. Specifically, the evaluation was made based on the following evaluation criteria. A and B represent levels which are acceptable for actual use.

Evaluation Criteria

A: Stickiness disappeared at an exposure energy of 1000 $mJ/cm^2$ or less.

B: Stickiness disappeared at an exposure energy of between 1000 $mJ/cm^2$ and 1500 $mJ/cm^2$.

C: Stickiness disappeared at an exposure energy of between 1500 $mJ/cm^2$ and 2000 $mJ/cm^2$.

D: Exposure energy of more than 2000 $mJ/cm^2$ was required to ensure no stickiness.

<Blocking Resistance>

The printed surface of a printed material was covered with the surface of a base material (back side). After a certain amount of time had elapsed, these were separated from each other and tearing of a film on the printed material or transfer of the printing onto the surface of the base material was evaluated.

Further, the printed materials used for the blocking test were all exposed with an exposure energy of 2,000 $mJ/cm^2$ in the curing sensitivity (tack-free sensitivity) test above.

Still further, for storage of the printed material, the surface of the printed material and the surface of the base material were arranged to face each other and they were stored for 24 hours in the same state (storage in a 45° C. incubator) with constant load (1 $kg/cm^2$) of a weight applied over the entire printed material. After 24 hours, the surface of the printed material and the surface of the base material were separated from each other and visual evaluation was carried out according to the following criteria. A corresponds to a level which is acceptable for actual use.

Evaluation Criteria

Evaluation was carried out according to the following three levels.

A: No film tearing on a printed surface and no ink transfer to a base surface.

B: Some film tearing on a printed surface or internal film rupture, or some ink transfer to a base surface (herein, "some" indicates less than 50% of the entire surface area).

C: Film rupture on a printed surface or internal film rupture are found over the entire surface, or ink transfer to the entire base surface (herein, "some" indicates 50% or more of the entire surface area).

<Jetting Stability>

The obtained inkjet ink composition was stored at room temperature for 4 weeks, and then recorded on a recording medium by using a commercially available inkjet recording device equipped with a Piezo type inkjet nozzle, similarly to the evaluation of curing sensitivity. When printing was carried out for 48 consecutive hours at room temperature, the presence of missing dots and ink scattering was evaluated with the naked eye. The evaluation was carried out according to the following criteria. A and B correspond to a level which is acceptable for actual use.

Evaluation Criteria

A: No missing dots or ink scattering or only 3 or less instances thereof.

B: 4 to 10 instances of missing dots or ink scattering

C: 11 or more instances of missing dots or ink scattering

<Color Reproducibility of White Ink Composition>

The whiteness of a printed material printed with the white ink composition of Examples 1 and 6 to 18, and Comparative Examples 1 to 5 was examined with the naked eye. The same printed material as the one used for the blocking test was used for this test. When there was yellow staining, color reproducibility was determined to be poor.

TABLE 6

| | Specific sensitizer or comparative sensitizer | Photopolymerization initiator | Color | Curing sensitivity | Blocking resistance | Jetting stability |
|---|---|---|---|---|---|---|
| Example 1 | Sensitizer I-8 | Initiator A + Initiator B | White | A | A | A |
| Example 2 | Sensitizer I-8 | Initiator A + Initiator B | Yellow | A | A | A |
| Example 3 | Sensitizer I-8 | Initiator A + Initiator B | Magenta | A | A | A |
| Example 4 | Sensitizer I-8 | Initiator A + Initiator B | Cyan | A | A | A |
| Example 5 | Sensitizer I-8 | Initiator A + Initiator B | Black | A | A | A |
| Example 6 | Sensitizer I-2 | Initiator A + Initiator B | White | B | A | B |
| Example 7 | Sensitizer I-4 | Initiator A + Initiator B | White | B | A | B |
| Example 8 | Sensitizer I-26 | Initiator A + Initiator B | White | B | A | B |
| Example 9 | Sensitizer I-17 | Initiator A + Initiator B | White | A | A | A |
| Example 10 | Sensitizer I-6 | Initiator A + Initiator B | White | A | A | A |
| Example 11 | Sensitizer I-11 | Initiator A + Initiator B | White | A | A | A |
| Example 12 | Sensitizer I-12 | Initiator A + Initiator B | White | B | A | A |
| Example 13 | Sensitizer I-8 | Initiator B + Initiator E | White | A | A | A |
| Example 14 | Sensitizer I-8 | Initiator C + Initiator B | White | B | A | A |
| Example 15 | Sensitizer I-8 | Initiator D + Initiator B | White | B | A | A |
| Example 16 | Sensitizer I-2, Sensitizer A | Initiator A + Initiator B | White | A | A | B |
| Example 17 | Sensitizer I-4, Sensitizer B | Initiator A + Initiator B | White | A | A | B |
| Example 18 | Sensitizer I-8, Sensitizer A | Initiator A + Initiator B | White | A | A | A |
| Comparative Example 1 | Diethylthioxanthone | Initiator A + Initiator B | White | C | B | B |
| Comparative Example 2 | 2-Chlorothioxanthone | Initiator A + Initiator B | White | C | B | C |
| Comparative Example 3 | 1-Chloro-4-isopropoxythioxanthone | Initiator A + Initiator B | White | C | B | C |
| Comparative Example 4 | 2-Methoxythioxanthone | Initiator A + Initiator B | White | D | B | B |
| Comparative Example 5 | Sensitizer I-8 | None | White | D | C | A |

As is clearly indicated in Table 6, the ink compositions of Examples 1 to 18 containing the specific sensitizer of the invention have better curing sensitivity and blocking resistance compared to the ink compositions of Comparative Examples 1 to 4, which use a conventionally known sensitizer. In addition, the ink composition of the invention has jetting stability that is acceptable for practical use.

Further, the ink compositions of Examples 1 to 5, 10, 11 and 13 containing the sensitizer I-6, I-8 or I-11 in which the substituent group $R^3$ in Formula (I) represents an alkyl group having 4 to 8 carbon atoms, and the ink composition of Example 9 containing the sensitizer I-17, were found to have favorable curing properties even under a low exposure amount, and good blocking resistance and jetting stability.

Further, an image formed on a printed material according to Examples 1 and 7 to 18 shows favorable white color. Thus, it was found that the ink composition of Examples 1 and 7 to 18 is a white ink composition which has favorable curing sensitivity, blocking resistance and jetting stability and also favorable color reproducibility.

Meanwhile, from the white ink composition of Comparative Examples 1 to 4, yellow staining thought to be derived from comparative sensitizers such as 2,4-diethylthioxantone, 2-chlorothioxantone, 2-methoxythioxantone, and 1-chloro-4-isopropoxythioxantone, was found. Therefore, the color reproducibility of a white image was not favorable.

In addition, even when the specific sensitizer was contained, the ink composition of Comparative Example 5, in which diethanolamine was added instead of a photopolymerization initiator, exhibited poor curing properties and yellow staining thought to be derived from the amine was observed after light exposure.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink composition comprising a sensitizer represented by the following Formula (I), a photopolymerization initiator, and a polymerizable compound having an ethylenic unsaturated bond:

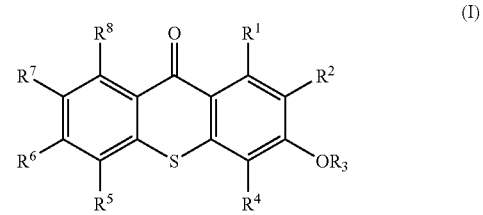

(I)

wherein in Formula (I), $R^1$, $R^6$ and $R^8$ each independently represent a hydrogen atom, a hydroxyl group, a halogen atom, a linear or branched alkyl group which may be substituted, or an alkoxy group which may be substituted, $R^2$, $R^4$, $R^5$ and $R^7$ each independently represent a hydrogen atom, a linear or branched alkyl group which may be substituted, a halogen atom, or a cyano group, $R^3$ represents a linear or branched alkyl group which is substituted with —$NR^9R^{10}$, a hydroxy group, an acryloyloxy group, or a metacryloyloxy group, or a cycloalkyl group which is substituted with —$NR^9R^{10}$, a hydroxy group, an acryloyloxy group, or a metacryloyloxy group, $R^9$ and $R^{10}$ each independently represent a hydrogen atom or an alkyl group having 1 to 4 carbon atoms, and $R^9$ and $R^{10}$ may bond to each other to form a ring, and when $R^3$ represents a linear or branched alkyl group, the alkyl group may consist of two or more alkyl chains that are connected to each other via one or more oxygen atom.

2. The ink composition of claim 1, wherein $R^3$ in Formula (I) is an alkyl group having 3 to 10 carbon atoms, which is further substituted with —$NR^9R^{10}$, a hydroxy group, an acryloyloxy group, or a metacryloyloxy group, wherein $R^9$ and $R^{10}$ each independently represent a hydrogen atom or an alkyl group having 1 to 4 carbon atoms, and $R^9$ and $R^{10}$ may bond to each other to form a ring.

3. The ink composition of claim 1, wherein $R^1$, $R^2$, $R^4$, $R^5$, $R^6$, $R^7$ and $R^8$ in Formula (I) are a hydrogen atom.

4. The ink composition of claim 1, wherein the photopolymerization initiator is at least one photopolymerization initiator selected from the group consisting of α-amino ketones and acylphosphine oxides.

5. The ink composition of claim 1, further containing a sensitizer represented by the following Formula (II):

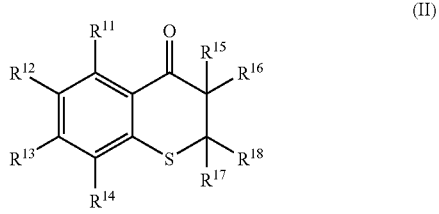

(II)

wherein in Formula (II), $R^{11}$, $R^{12}$, $R^{13}$, $R^{14}$, $R^{15}$, $R^{16}$, $R^{17}$ and $R^{18}$ each independently represent a hydrogen atom, alkyl group, a halogen atom, a hydroxy group, a cyano group, a nitro group, an amino group, an alkylthio group, an alkylamino group, an alkoxy group, an alkoxycarbonyl group, an acyloxy group, an acyl group, a carboxy group or a sulfo group, two of $R^{11}$, $R^{12}$, $R^{13}$ and $R^{14}$ that are adjacent to one another may fuse together to form a 5- to 6-membered aliphatic ring, an aromatic ring or a heterocyclic ring, and although $R^{15}$ or $R^{16}$ may be connected to $R^{17}$ or $R^{18}$ to form an aliphatic ring, they do not form an aromatic ring.

6. The ink composition of claim 1, wherein the ink composition is a white ink composition.

7. An inkjet recording method comprising:

jetting the ink composition of claim 1 onto a recording medium;

irradiating the jetted ink composition with active radiation; and curing the ink composition.

8. The inkjet recording method of claim 7, wherein the active radiation is a UV ray emitted by a light emitting diode which generates a UV ray having an emission peak wavelength in the range of from 340 nm to 370 nm and a maximum illuminance intensity on the surface of the recording medium in the range of from 10 mW/cm$^2$ to 2,000 mW/cm$^2$.

9. The ink composition of claim 1, wherein, in Formula (I), $R^3$ represents an alkyl group substituted with —$NR^9R^{10}$, wherein each of $R^9$ and $R^{10}$ independently represents a hydrogen atom or an alkyl group having 1 to 4 carbon atoms.

\* \* \* \* \*